United States Patent
Aust

(10) Patent No.: US 7,664,788 B2
(45) Date of Patent: Feb. 16, 2010

(54) METHOD AND SYSTEM FOR SYNCHRONIZING CACHED FILES

(75) Inventor: Brian S. Aust, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 11/032,870

(22) Filed: Jan. 10, 2005

(65) Prior Publication Data

US 2006/0155776 A1    Jul. 13, 2006

(51) Int. Cl.
*G06F 12/00* (2006.01)
(52) U.S. Cl. .................. 707/201; 709/248
(58) Field of Classification Search ............. 707/201; 709/248
See application file for complete search history.

(56) References Cited

U.S. PATENT DOCUMENTS

| | | | | |
|---|---|---|---|---|
| 5,974,238 A | * | 10/1999 | Chase, Jr. ............... | 709/248 |
| 6,119,151 A | * | 9/2000 | Cantrell et al. ............... | 709/216 |
| 6,317,754 B1 | * | 11/2001 | Peng ........................... | 707/203 |
| 2003/0115222 A1 | * | 6/2003 | Oashi et al. ................. | 707/200 |
| 2003/0137536 A1 | * | 7/2003 | Hugh ........................ | 345/744 |

* cited by examiner

*Primary Examiner*—John E Breene
*Assistant Examiner*—Thu-Nguyet Le
(74) *Attorney, Agent, or Firm*—Workman Nydegger

(57) ABSTRACT

Described is a system and method that synchronizes cached files and directories with a server's files and directories via a layered architecture, by collapsing state information into an index into a fixed set of known states, and looking up the action that synchronizes that state. The actions are then taken to synchronize the content. Any of fifty possible synchronization states are thus handled. A synchronization controller requests a subsystem to evaluate a local cache and remote file system to generate state flags for each item considered for synchronization. The synchronization controller processes the state information to identify a selected table from among a plurality of tables that contain the fifty values, and uses other flags to compute an index into the table. The selected table contains values that index into an action table containing actions that specify an operation set that is requested to synchronize the particular state scenario.

22 Claims, 17 Drawing Sheets

METHOD AND SYSTEM FOR SYNCHRONIZING CACHED FILES

FIELD OF THE INVENTION

The invention relates generally to computer systems, and more particularly to cached computer files.

BACKGROUND

Computer users often need to disconnect from a network and work offline, such as when traveling, working at home, or at times when the network is down. As a result, various mechanisms have been directed to caching network information on a local computer to allow the information to be accessed when the local computer is disconnected from the network. Local caching also reduces the amount of data communicated between the network servers and a client working in an offline mode. Benefits to reducing the amount of transmitted data include a reduction in the server workload, a reduction in the client's perceived latency, and an increase in available network bandwidth.

However, synchronizing the cached files with the server file system's items (directories and files) has always suffered from problems. One such problem is that some previous existing synchronization mechanisms are very liberal with their use of network resources, resulting not only in heavy network loads but also in heavy server loads when many clients are attempting to synchronize with a single server.

Perhaps more significantly, synchronizing is a complex problem, and thus existing synchronization mechanisms are often unreliable and unpredictable. In part this is because some known contemporary synchronization mechanisms use a significant amount of flag-based conditional code to handle special cases, which evolved as those special cases were identified. A consequence of this is a synchronization mechanism that is difficult to debug and difficult to explain as to when and why certain items are synchronized or not synchronized.

What is needed is a comprehensively-designed system and method for synchronizing offline files that consistently operates in a deterministic manner. The method and system should be reliable, predictable, understandable, diagnosable and maintainable for essentially all possible scenarios.

SUMMARY OF THE INVENTION

Briefly, the present invention is directed towards a system and method that synchronizes cached files and directories with a server's files and directories via a layered architecture that collapses a set of state information into an index into a fixed set of known states. The architecture includes mechanisms that look up the action to perform to synchronize that state, and polymorphically carry out the applicable operations to synchronize the content. One aspect ensures that any possible synchronization state is handled, where each state identifies a scenario involving a locally cached item (file or directory) and a remote file system item (file or directory), such as the presence of one and/or the absence of the other. To this end, a current implementation identifies fifty synchronization states that are possible when synchronizing items comprising cached files and/or directories and server's files and/or directories.

Upon a request from a synchronization controller, a FastSync subsystem evaluates the local cache and one or more remote file system entries to generate a set of state flags for each item considered for synchronization. The FastSync subsystem also responds to a fixed set of simple commands to perform synchronization-related activities between the local offline files cache and the remote file system. The synchronization controller contains the logic that determines which actions are to be performed on which items.

To identify which of the fifty synchronization states applies to a particular file/directory pair, and thereby correctly direct the FastSync subsystem to perform the proper operations to bring that state into equilibrium, the synchronization controller processes state information (e.g., a set of flags) returned by the FastSync subsystem for each item being considered for synchronization. In one implementation, to make the task manageable, the synchronization controller uses logic on selected flags to identify a selected table from among a plurality of tables (e.g., a client only exists table, a server only exists table, or a client and server exist table), wherein each table has entries that each map to a code comprising one of the fifty values. The synchronization controller also uses other flags to compute an index into the selected table to determine the entry and thus obtain the code. In turn, each of the codes corresponds to an index into an action factory table that identifies actions that specify operations that will be requested of the FastSync subsystem to synchronize the particular state scenario.

The table of synchronization actions uses object-based polymorphism to represent the necessary actions. Actions may involve one or multiple individual FastSync operations.

Other synchronization-related activities may leverage the layered architecture, including "pinning," which comprises of copying a remote file into the local cache and marking it as excluded from automatic eviction. In effect, this is simply a one-way synchronization, with the additional action of excluding the item from automatic eviction. To do this, specialized forms of the synchronization controller specify their own set of actions responding to each of the fifty synchronization states. Although when pinning many of the states require no action, of those that do, the states require actions that are different from used by a two-way synchronization controller. A controller hierarchy allows creation of specialized controllers that take specialized actions without modifying the core underlying synchronization engine.

By assigning a value to each granular synchronization state and computing an index into an action table, where each synchronization state corresponds directly to an action table index, the action to take is automatically and immediately known. This provides multiple benefits including that the full set of synchronization states is properly handled, without significant conditional logic for special cases. In the event that a synchronization outcome is unexpected, the layers may be separately examined and evaluated to determine whether the state flags correctly computed the index into the action table, whether the action specified in the action table was correct, and whether the action specified in the action table contains the correct FastSync operation codes.

Other advantages will become apparent from the following detailed description when taken in conjunction with the drawings, in which:

DETAILED DESCRIPTION

Exemplary Operating Environment

Figure 1:
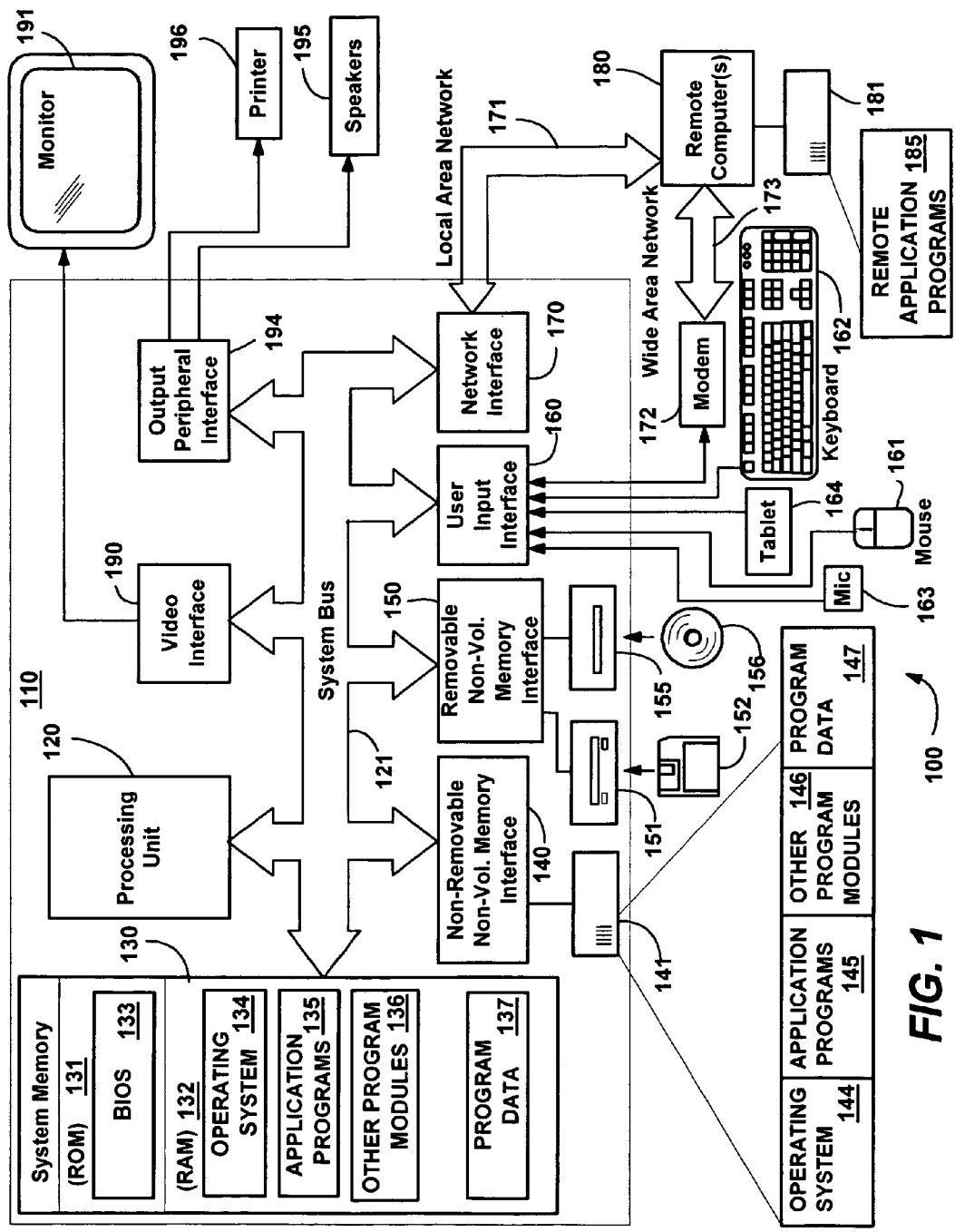
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Synchronizing Local and Remote Files and Directories

The present invention is generally directed towards a system and method by which local offline cache items (files and directories) are synchronized with remote network file system items (server files and directories) by determining a relatively reasonable number of synchronization states, and then translating those states to a synchronization action. As will be understood, this is accomplished in one implementation by obtaining a synchronization status data structure (e.g., including a 32-bit value), processing the status data structure, including applying logic to determine a state translation table (e.g., from among three that are available, namely client only, server only, or client and server), and using other information in the data structure to compute an index into the state translation table. This essentially maps the status structure to a particular synchronization state, (e.g., presently one of fifty possible values). In turn, each of those values map to an action factory object that generates actions to synchronize the local offline file/directory with the online server file/directory. As will be also understood, numerous ways to implement the present invention are feasible, and only some of the alternatives are described herein. For example, the present invention is primarily described below with reference to a layered, object-based model divided across kernel and user modes that uses various tables to perform the above-described operations. The described objects are COM (component object model) and DCOM (distributed component object model) type objects. Notwithstanding, other types of arrangements are feasible; for example, the present invention may be configured to operate without COM/DCOM objects (or objects at all) and without the same number and separation of user and kernel mode components and/or tables. As such, the present invention is not limited to any particular examples used herein, but rather may be used various ways that provide benefits and advantages in computing in general.

Figure 2:
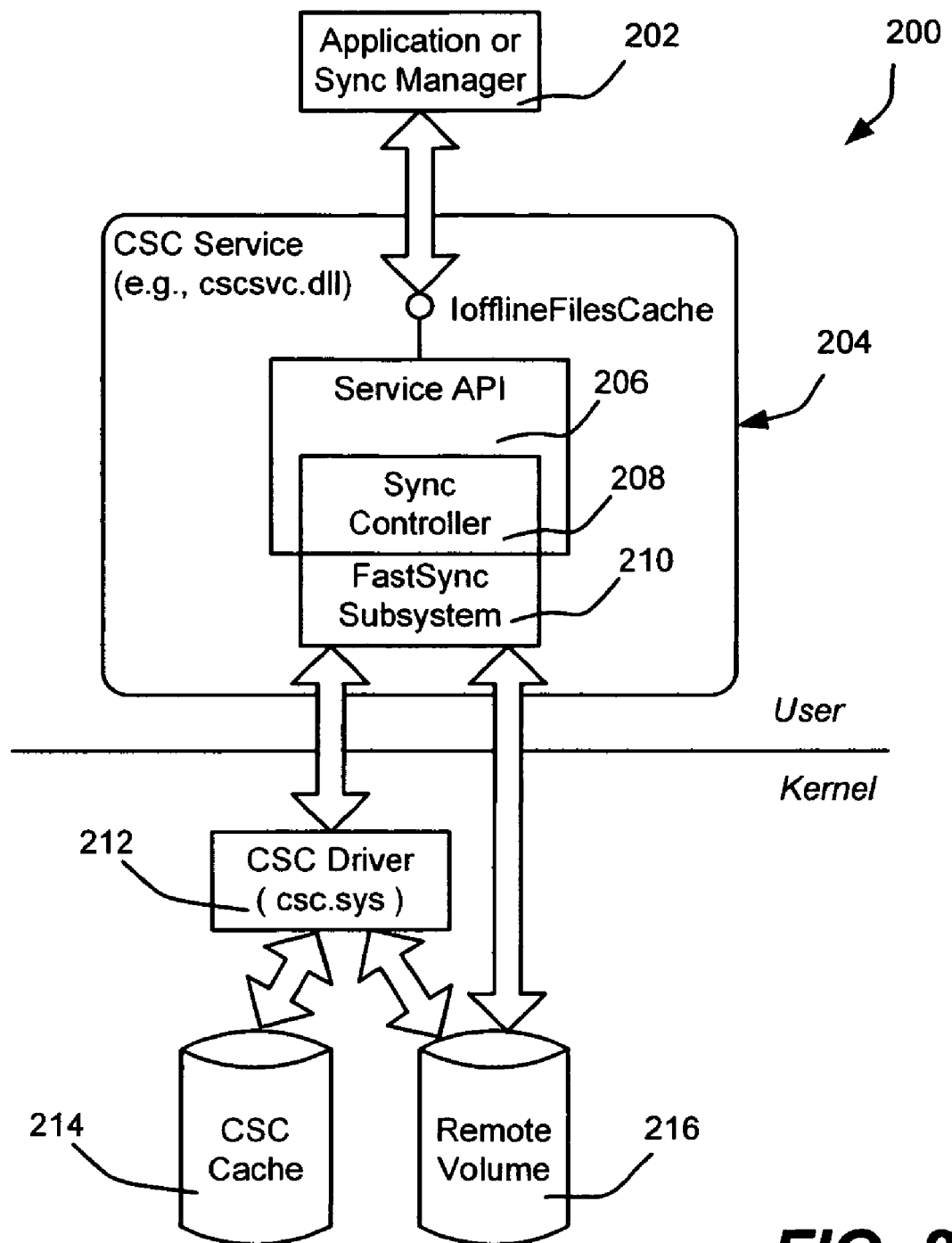
FIG. 2 is a block diagram comprising a general example architecture for implementing cache synchronization in accordance with various aspects of the present invention.

Turning to FIG. 2, there is shown an example arrangement of components generally designated 200, in which synchronization-related mechanisms of the present invention are divided into a number of layers. In this example implementation, an application 202 communicates with a client-side caching (CSC) service 204 via a service API set 206, to direct a synchronization controller 208 of the service 204 to synchronize a particular file or directory, and to receive progress and status information. Note that one such application program comprises a user-mode synchronization (sync) manager that registers an offline files synchronization handler component. Further, note that in this example implementation, the service API set 206 contains the synchronization controller 208, which (as described below) controls the FastSync subsystem 210 during synchronization processing, and although the synchronization controller 208 is part of the service API 206, the present invention will be primarily described with reference to the synchronization controller 208.

As described below, the client-side caching service 204 obtains from a FastSync subsystem 210 a synchronization state data structure containing information about the items being synchronized. The synchronization controller 208 evaluates that information, consults system policy and the like when necessary, and directs the FastSync subsystem 210 to perform one or more primitive synchronization-related operations on those items.

To provide the data structure, the FastSync subsystem 210 efficiently examines both local and remote state, building up an in-memory tree of state information for use by the client-side caching service 204. In response to operation requests from the client-side caching service 204, the FastSync subsystem 210 makes the necessary calls to a client-side caching driver 212 to perform these and other operations, and report progress/status back to the client-side caching service 204. Although not necessary to the present invention, in one implementation, when an operation is requested via a CSC-SyncTakeAction (described below), the FastSync subsystem 210 packages up the operation, item pointer, and context information into an internal context block and queues that packet as a work item for a process thread pool to handle. Note that internal queuing ensures that actions are executed in the proper order. When a thread is available to work on an operation, the FastSync subsystem 210 extracts an item from this queue and performs the work, making calls to the associated controller callbacks as necessary. Further note that FastSync subsystem operations are asynchronous. However, because callbacks may execute at any time from one of many thread pool threads, callback context has no particular thread affinity and calls to client progress (IOfflineFilesSyncProgress) and conflict handling (IOfflineFilesSyncConflictHandler) implementations are thus serialized, e.g., by the synchronization controller 208.

The client-side caching service 204 then reflects the progress/status back to the calling application program 202. The client-side caching driver 212 is responsible for interacting with the local cache and redirector subsystems, (not explicitly shown in FIG. 2 but implicitly represented by the CSC cache 214 and remote volume 216, respectively).

Figure 3:
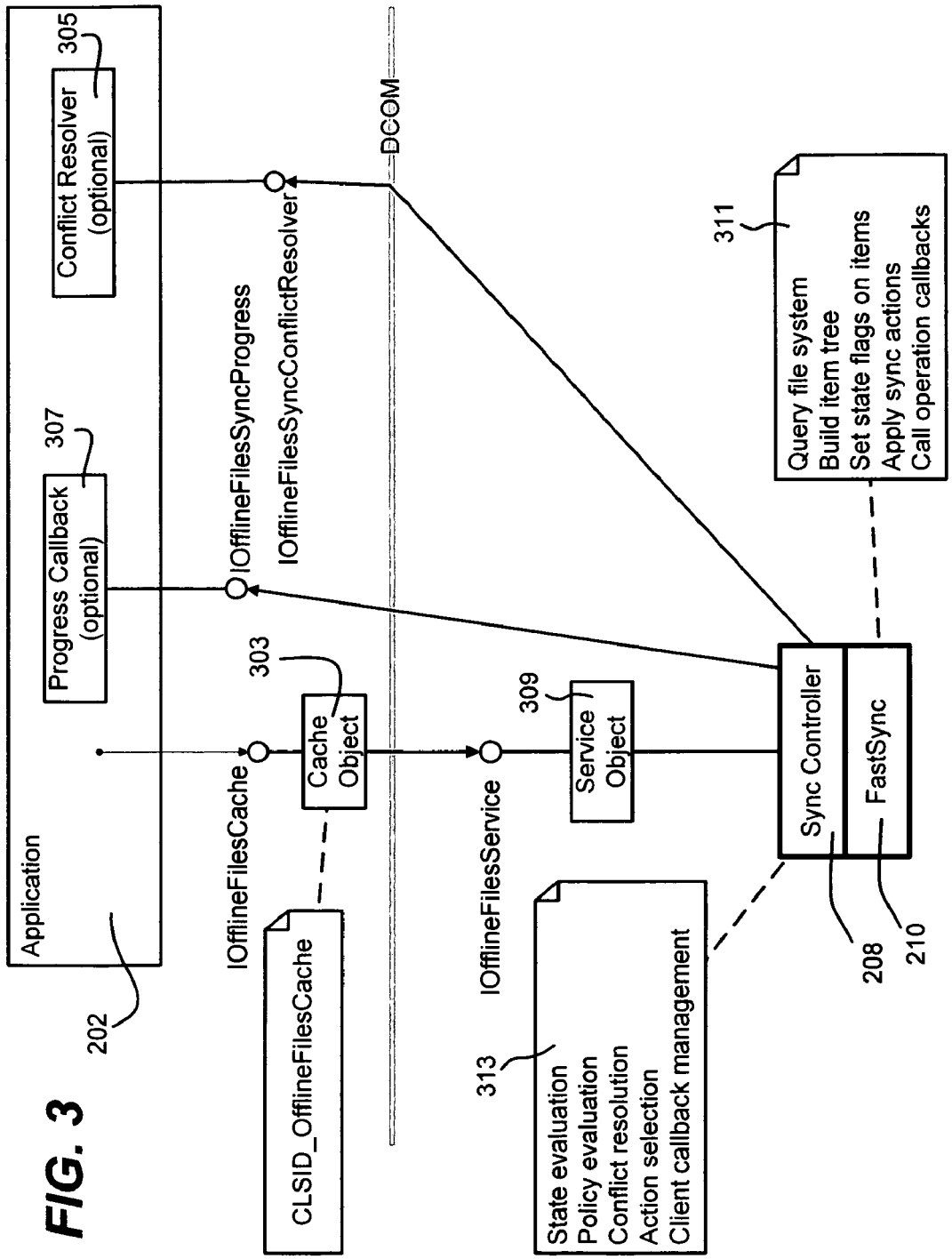
FIG. 3 is a block diagram comprising objects and additional information used in and example implementation for cache synchronization in accordance with various aspects of the present invention.

In one particular example implementation generally represented in FIG. 3, when an API client (e.g., the application program 202) invokes a synchronization operation, the client application program 202 creates an instance of a cache object 303 using CoCreateInstance and the class ID CLSID_OfflineFilesCache. The cache object 303 implements an IOfflineFilesCache interface, which provides a "Synchronize" method. Through the Synchronize method, the client application program 202 may pass one or more paths to be synchronized, as well as a small set of flags to control the operation, as set forth in the following table:

| | |
|---|---|
| const DWORD OFFLINEFILES_SYNC_CONTROL_FLAG_FILLSPARSE | = 0x00000001; |
| const DWORD OFFLINEFILES_SYNC_CONTROL_FLAG_SYNCIN | = 0x00000002; |
| const DWORD OFFLINEFILES_SYNC_CONTROL_FLAG_SYNCOUT | = 0x00000004; |
| const DWORD OFFLINEFILES_SYNC_CONTROL_FLAG_PINNEWFILES | = 0x00000008; |
| const DWORD OFFLINEFILES_SYNC_CONTROL_FLAG_PINLINKTARGETS | = 0x00000010; |
| const DWORD OFFLINEFILES_SYNC_CONTROL_FLAG_PIN_FORUSER | = 0x00000020; |
| const DWORD OFFLINEFILES_SYNC_CONTROL_FLAG_PIN_FORALL | = 0x00000040; |
| const DWORD OFFLINEFILES_SYNC_CONTROL_FLAG_PIN_FORREDIR | = 0x00000080; |

```
HRESULT
Synchronize(
    LPCWSTR *rgpszPaths,
    int cPaths,
    BOOL bAsync,
    DWORD dwSyncControl,
    IOfflineFilesSyncConflictHandler *pISyncConflictHandler,
    IOfflineFilesSyncProgress *pIProgress,
    GUID *pSyncId);
```

The client application program 202 may optionally provide implementations of IOfflineFilesSyncConflictHandler component 305 to handle sync conflicts as they occur and an IOfflineFilesSyncProgress component 307 to monitor progress of the operation. If not provided by the client application program 202, default implementations may be automatically provided inside of the client-side caching service 204. Note that the bAsync parameter causes the function to return immediately and perform the operation on a separate thread, using COM's build-in asynchronous interface mechanism. The pSyncId parameter is optional. If it is provided, the GUID it references is used in sync-related events so that those events may be correlated with a particular sync operation.

Upon instantiation, the cache object 303 automatically contacts the client-side caching service 204 and makes a connection with a Service object 309, which implements an internal interface that is similar to IOfflineFilesCache. This interaction is invisible to a client application program 202 using IOfflineFilesCache::Synchronize. In response to the Synchronize method, the client-side caching service 204 interacts with the FastSync subsystem 210 to synchronize the requested files and directories and to report progress and conflicts back to the client as necessary.

In general, as represented by the appended functional information set 311, the FastSync subsystem 210 is responsible for efficiently querying the remote file system and local cache and representing the status of the items found through item descriptors in a tree structure. Further, in response to one of a well-defined set of commands, the FastSync subsystem 210 carries out the necessary data transfer operations to bring the remote and local state into equilibrium. In this example implementation, the FastSync subsystem 210 makes no policy decisions, but rather observes, reports, and acts as directed.

In this implementation, as represented by the functional information set 313, the synchronization (Sync) controller 208 directs the FastSync subsystem 210 to query the local and remote state of a file path, examines and evaluates the state information produced by the FastSync subsystem 210, and directs the FastSync subsystem 210 to perform one or more actions on each item to bring the local and remote state into equilibrium. Although this separation of functionality is not necessary to the present invention, numerous benefits arise in the architecture from this separation. For example, the synchronization controller 208 focuses on making policy decisions, while the FastSync subsystem 210 focuses on efficiently querying and updating file system/cache state. Moreover, whenever a given scenario is not synchronizing properly, a straightforward check of tracing information can quickly determine whether the FastSync subsystem 210 is correctly reporting the state of the remote file systems and a local cache, whether the synchronization controller 208 is correctly evaluating that state and directing the FastSync subsystem 210 to take the correct action, and/or whether the FastSync subsystem 210 is correctly performing the specified action. This division of responsibility thus results in a significant reduction in troubleshooting time in the event that there is any unexpected behavior.

Figure 4:
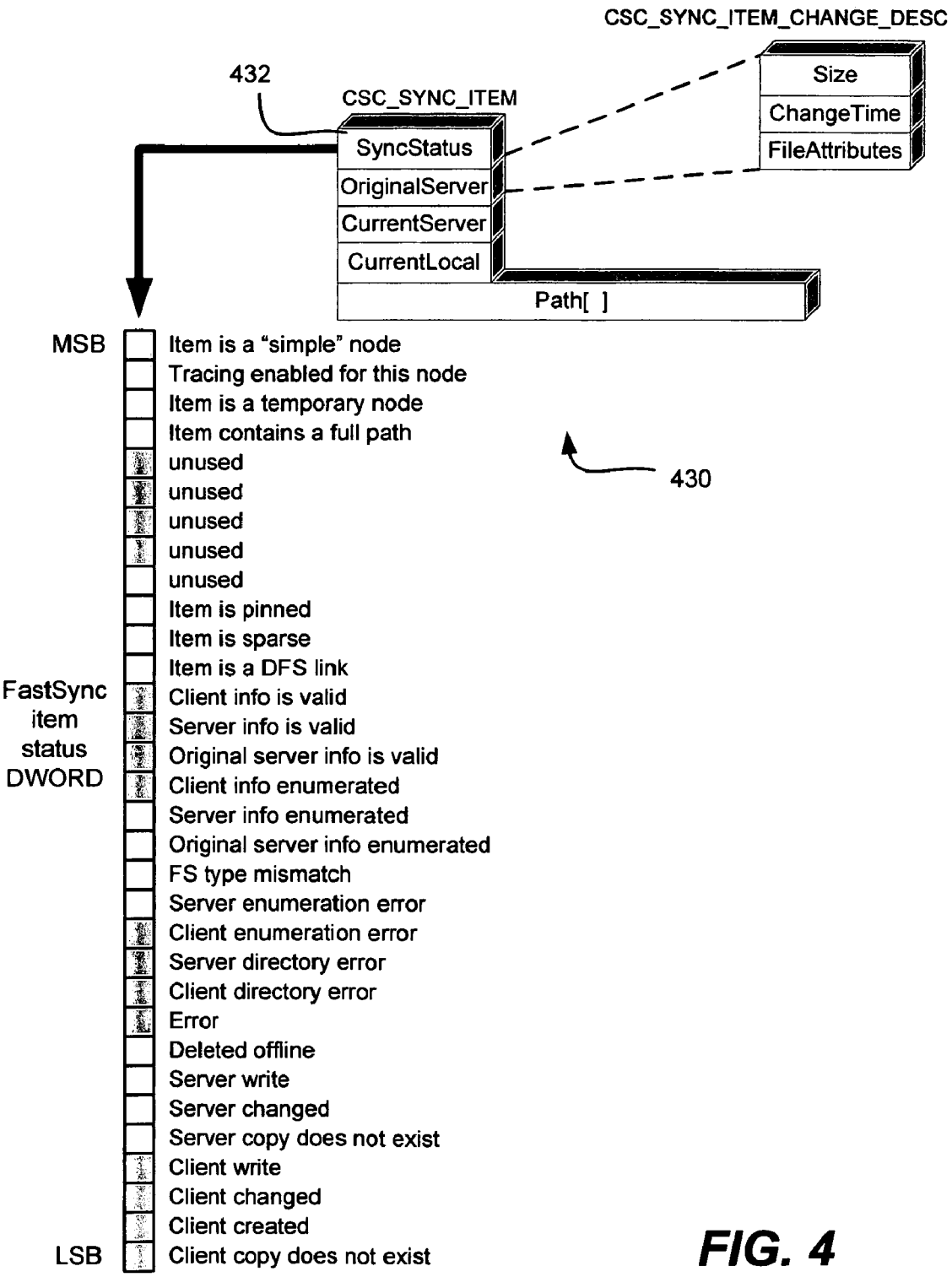
FIG. 4 is a representation of synchronization state data structures interpreted by a synchronization controller in determining synchronization actions for an item in accordance with various aspects of the present invention.
Figure 5:
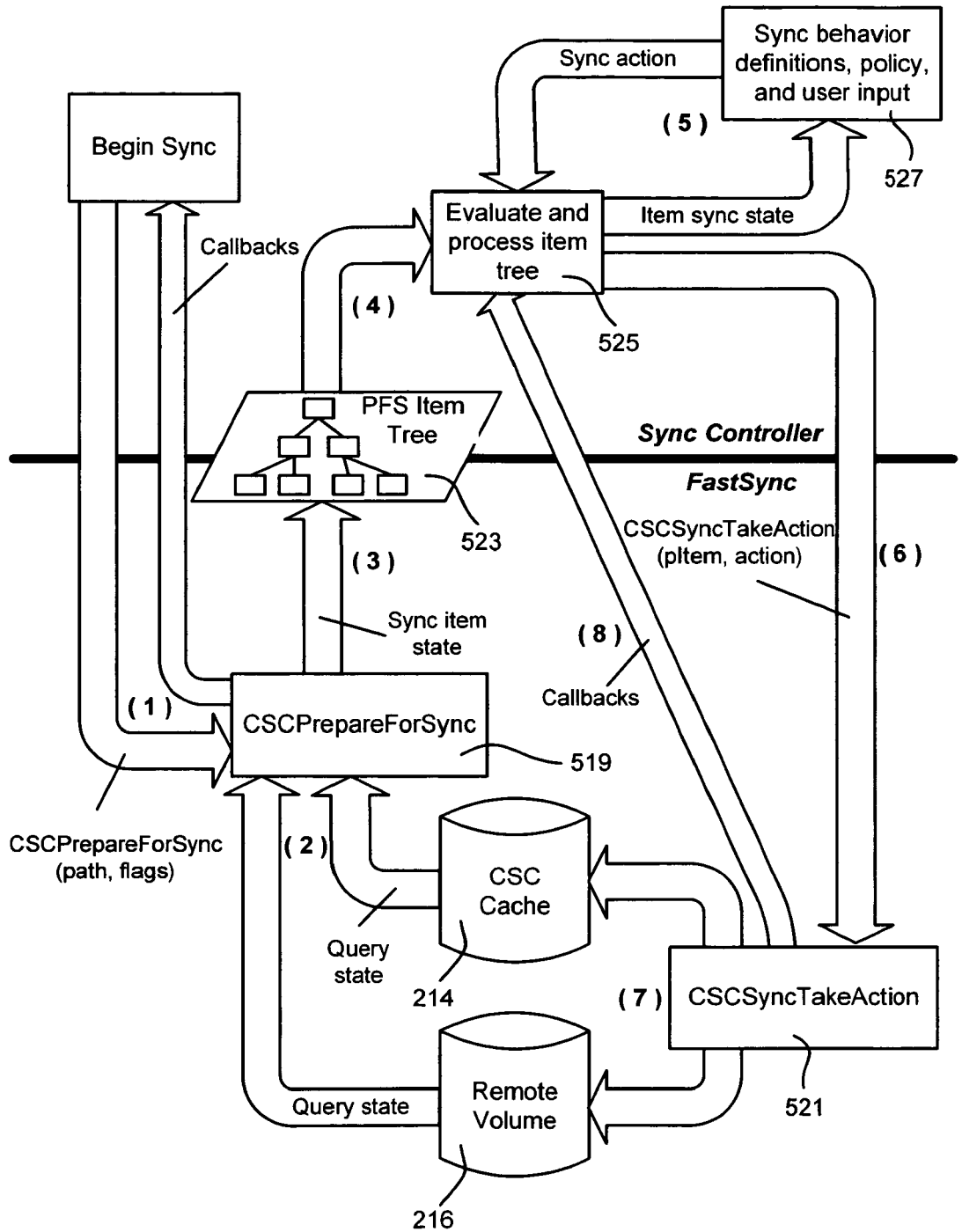
FIG. 5 is a representation of an example flow of information used to determine a synchronization action based on synchronization state data structures in accordance with various aspects of the present invention.

FIG. 4 is a representation of the data structures 430 including the status information data structure 432 provided to the synchronization controller 208 by the FastSync subsystem 210, and FIG. 5 illustrates high-level communications between the synchronization controller 208 and the FastSync subsystem 210. As generally represented in FIG. 5, the FastSync subsystem 210 implements two primary methods for use by the synchronization controller 208, including CSCPrepareForSync 519 and CSCSyncTakeAction 521. To begin a synchronization operation, the synchronization controller 208 makes a call to CSCPrepareForSync (PFS) 519, passing a path (file or directory) as part of the process and a set of flags to control the behavior of the function. The flags, which for example in one implementation are named "CSC_SYNC_PFS_FLAG_FIND_SPARSE_FILES," "CSC_SYNC_PFS_FLAG_FIND_CLIENT_CHANGES" and "CSC_SYNC_PFS_FLAG_FIND_SERVER_CHANGES," allow the caller to control the scope of the FastSync subsystem's enumeration. Choices include "query local only," "query remote only," "query local and remote" and "look for sparse files."

By way of example, if the synchronization controller 208 is interested only in filling only sparse files in the cache, the synchronization controller 208 sets only the CSC_SYNC_PFS_FLAG_FIND_SPARSE_FILES flag. Likewise, if the controller 208 is interested in bringing both the local and remote state into equilibrium, it would specify both the _FIND_CLIENT_CHANGES and _FIND_SERVER_CHANGES flags via the following:

```
DWORD
CSCPrepareForSync(
    PCSC_SYNC_PFS_STATUS_CALLBACK Callback,
    PCWSTR NetworkPath,
    OPTIONAL PCWSTR LocalPath,
    ULONG Flags,
    CSC_SYNC_HANDLE *Handle,
    INT_PTR CallerContext)
```

During preparation processing, each time a directory is encountered, the FastSync subsystem 210 calls a callback function implemented by the synchronization controller 208. This callback function directs the FastSync subsystem 210 to process this callback function directs the FastSync subsystem 210 to process the directory or skip that directory. Through this mechanism, the synchronization controller 208 may choose to skip an entire directory tree in response to a system synchronization policy, avoiding unnecessary processing.

During CSCPrepareForSync, the FastSync subsystem 210 queries the local cache 214 and/or the remote file system (volume 216) as directed by the PFS flags. This is done efficiently using queries of directory information. The FastSync subsystem 210 further builds an in-memory tree of "items," in which each item represents a file or directory involved in the synchronization; the item information is contained in the status information data structure. As represented in the data structures 430 of FIG. 4 for one such example status information data structure/item 432, each item contains a detailed set of flags and state information describing data such as existence, change, creation, and deletion.

As readily apparent from the synchronization status information data structure/item 432 of FIG. 4, there is a relatively large amount of state information present with each item in a PFS item tree 523 (FIG. 5). In keeping with the present invention, one of the tasks of the synchronization controller 208 is to understand this information and make intelligent synchronization policy decisions based thereon.

One value returned by CSCPrepareForSync 519 comprises a handle to this in-memory tree 523 of items. At this point, the CSCPrepareForSync operation 519 is finished, and the information it collected is present in the PFS item tree 523. These activities are represented by the parenthetical labels numbered (1), (2), and (3) in FIG. 5. Note that many of these operations actually occur in parallel, although the numbers used in FIG. 5 identify a basic sequence as one follows the processing for a particular item.

In accordance with an aspect of the present invention, once the PFS item tree 523 has been constructed, the synchronization controller 208 processes that tree, in a pre-order (e.g., top-down) traversal, as represented in FIG. 5 by the operation 525 and the parenthetical label numbered (4). As also represented in FIG. 5 by the operation 527 and the parenthetical labels numbered (5) and (6), each item undergoes the processing to compute a synchronization state, resolve any conflict if applicable, compute a FastSync action (described below) and deliver the action to the FastSync subsystem 210.

In one implementation, the synchronization state is one value within a set of (at present) fifty codes, each code value representing a recognized combination of local and remote state. Examples of such codes include FileChangedOnServer, FileDeletedOnClient, FileChangedOnClient_DirOnServer, DeletedOnClient_FileChangedOnServer, and Stable.

The full set of fifty states (numbered 0-49) are presented in the table below, in which a syntax scheme includes the term "client," which refers to the state in the local client-side caching cache 214, while the term "server" refers to the state on the remote server (share) volume 216; when both client and server state are known, the client's state is at the start of the name and the server's state is at the end of the name (some states know only about either the client or server state):

| No. | Name |
|---|---|
| 0 | Stable |
| 1 | FileOnClient_DirOnServer |
| 2 | FileOnClient_NoServerCopy |
| 3 | DirOnClient_FileOnServer |
| 4 | DirOnClient_FileChangedOnServer |
| 5 | DirOnClient_NoServerCopy |
| 6 | FileCreatedOnClient_NoServerCopy |
| 7 | FileCreatedOnClient_FileChangedOnServer |
| 8 | FileCreatedOnClient_DirChangedOnServer |

-continued

| No. | Name |
|---|---|
| 9 | FileCreatedOnClient_FileOnServer |
| 10 | FileCreatedOnClient_DirOnServer |
| 11 | FileCreatedOnClient_DeletedOnServer |
| 12 | FileChangedOnClient_ChangedOnServer |
| 13 | FileChangedOnClient_DirOnServer |
| 14 | FileChangedOnClient_DirChangedOnServer |
| 15 | FileChangedOnClient_DeletedOnServer |
| 16 | FileSparseOnClient_ChangedOnServer |
| 17 | FileSparseOnClient_DeletedOnServer |
| 18 | FileSparseOnClient_DirOnServer |
| 19 | FileSparseOnClient_DirChangedOnServer |
| 20 | DirCreatedOnClient_NoServerCopy |
| 21 | DirCreatedOnClient_DirOnServer |
| 22 | DirCreatedOnClient_FileOnServer |
| 23 | DirCreatedOnClient_FileChangedOnServer |
| 24 | DirCreatedOnClient_DirChangedOnServer |
| 25 | DirCreatedOnClient_DeletedOnServer |
| 26 | DirChangedOnClient_FileOnServer |
| 27 | DirChangedOnClient_FileChangedOnServer |
| 28 | DirChangedOnClient_ChangedOnServer |
| 29 | DirChangedOnClient_DeletedOnServer |
| 30 | NoClientCopy_FileOnServer |
| 31 | NoClientCopy_DirOnServer |
| 32 | NoClientCopy_FileChangedOnServer |
| 33 | NoClientCopy_DirChangedOnServer |
| 34 | DeletedOnClient_FileOnServer |
| 35 | DeletedOnClient_DirOnServer |
| 36 | DeletedOnClient_FileChangedOnServer |
| 37 | DeletedOnClient_DirChangedOnServer |
| 38 | FileSparseOnClient |
| 39 | FileChangedOnClient |
| 40 | FileRenamedOnClient |
| 41 | DirSparseOnClient |
| 42 | DirChangedOnClient |
| 43 | DirRenamedOnClient |
| 44 | FileChangedOnServer |
| 45 | FileRenamedOnServer |
| 46 | FileDeletedOnServer |
| 47 | DirChangedOnServer |
| 48 | DirRenamedOnServer |
| 49 | DirDeletedOnServer |

In accordance with an aspect of the present invention, the applicable state code is computed from the state information (for each item) including the status information 432 (FIG. 4) collected by the FastSync subsystem 210. The translation of the FastSync subsystem 210 item state to this synchronization state code concept greatly simplifies the overall synchronization process, e.g., without such translation, the interpretation of the state information of FIG. 4 would be spread and repeated widely throughout synchronization handling. Instead, by converting the item state information to one of a set of known synchronization states, it is substantially easier to follow the synchronization steps used to synchronize a particular item. By associating different synchronization actions with particular synchronization states, the FastSync subsystem 210 may be used for other synchronization-related jobs such as "pinning" (preventing automatic removal of a cached file), as described below.

Of the set of fifty synchronization states, some are easily addressed with a simple transfer of state from one endpoint to the other, e.g., the cached version is copied to the server or vice-versa to make the status stable (until another change, if any). In such simple scenarios, an item's state has been changed on only one endpoint. There are also more complex synchronization scenarios where changes are detected in both the local and remote state. These are referred to as "conflicts" and are handled in special ways, e.g., via user input and/or policy; in general, conflict handling evaluates the associated synchronization state, selects which state (local or remote) is desired, and determines which FastSync subsystem operation (or combination of operations) is necessary to bring that item into equilibrium. Once the necessary operation or operations are identified, processing continues in the same manner as in non-conflicting cases.

In accordance with another aspect of the present invention, an action (a FastSync action) is computed from the FastSync item state 432 by examining the FastSync state for an item, and translating that item state into a synchronization state by computing an index into a translation table. Each entry in the table contains one of the fifty synchronization state codes; the synchronization state is obtained from the table at the computed index. In one implementation, the synchronization state value (e.g., 0-49) is used as an index into yet another table that locates an action factory object that knows how to generate actions to bring the associated state into equilibrium. Each synchronization controller type is free to use a unique sync-state-to-action-factory mapping. The action factory is then instructed to create an action object instance.

Once the action has been identified, the FastSync subsystem 210 is directed to apply the action to the item and then monitor the results. Directing e FastSync subsystem 210 to apply an action is accomplished using the CSCSyncTakeAction function 521 (FIG. 5). This function 521 takes a pointer to a PFS tree item, a FastSync "operation" code, an optional parameter block, and a set of callback pointers through which FastSync communicates with the sync controller during processing:

```
DWORD
CSCSyncTakeAction(
    IN OUT CSC_SYNC_HANDLE Handle,
    IN PCWSTR FullPath,
    IN OUT PCSC_SYNC_ITEM Item,
    IN CSC_SYNC_ACTION Action,
    IN OPTIONAL PCSC_SYNC_ACTION_PARAMETER
    ActionParameter,
    IN PCSC_SYNC_ACTION_COMPLETION Callback,
    IN INT_PTR CallerContext,
    IN ULONG Flags,
    IN OPTIONAL
    PCSC_SYNC_ACTION_TREE_ITEM_CALLBACK
    TreeItemCallback,
    IN OPTIONAL
    PCSC_SYNC_ACTION_TREE_ITEM_COMPLETION
    TreeItemCompletion)
```

As described above, one of the simplifying aspects of this design is the identification of a fixed set of synchronization states, each describing a particular scenario between an item in the local cache and its copy on the remote server. At present, the fifty states that have been identified provide an unambiguous scheme in which it is clear as to the state of the item.

To translate the state of an item of the PFS tree 523 to one of the synchronization states in the above table, the item state is examined in a manner that is understandable and maintainable. As shown in FIG. 4, each PFS tree item contains significant state information, corresponding to a bit value for each relevant piece of FastSync item state information. The possible combinations of those state bits are computed and used to assign a synchronization state value from the above table. More particularly, of the up to 32-bits of returned status information and of the "original", "remote", and "local" change information stored in a PFS tree item, there are fifteen pieces of item state that may contribute to translation to the associated synchronization state. However, assigning a bit to each of these fifteen pieces of item state would result in a translation matrix containing 32,768 entries, which would be difficult to build and maintain as well as expensive memory-wise.

To provide one manageable solution, the existence or non-existence of the items may be used, in which three possibilities include that only the client copy exists, only the server copy exists, or both the client and server copies exist.

Figure 6:
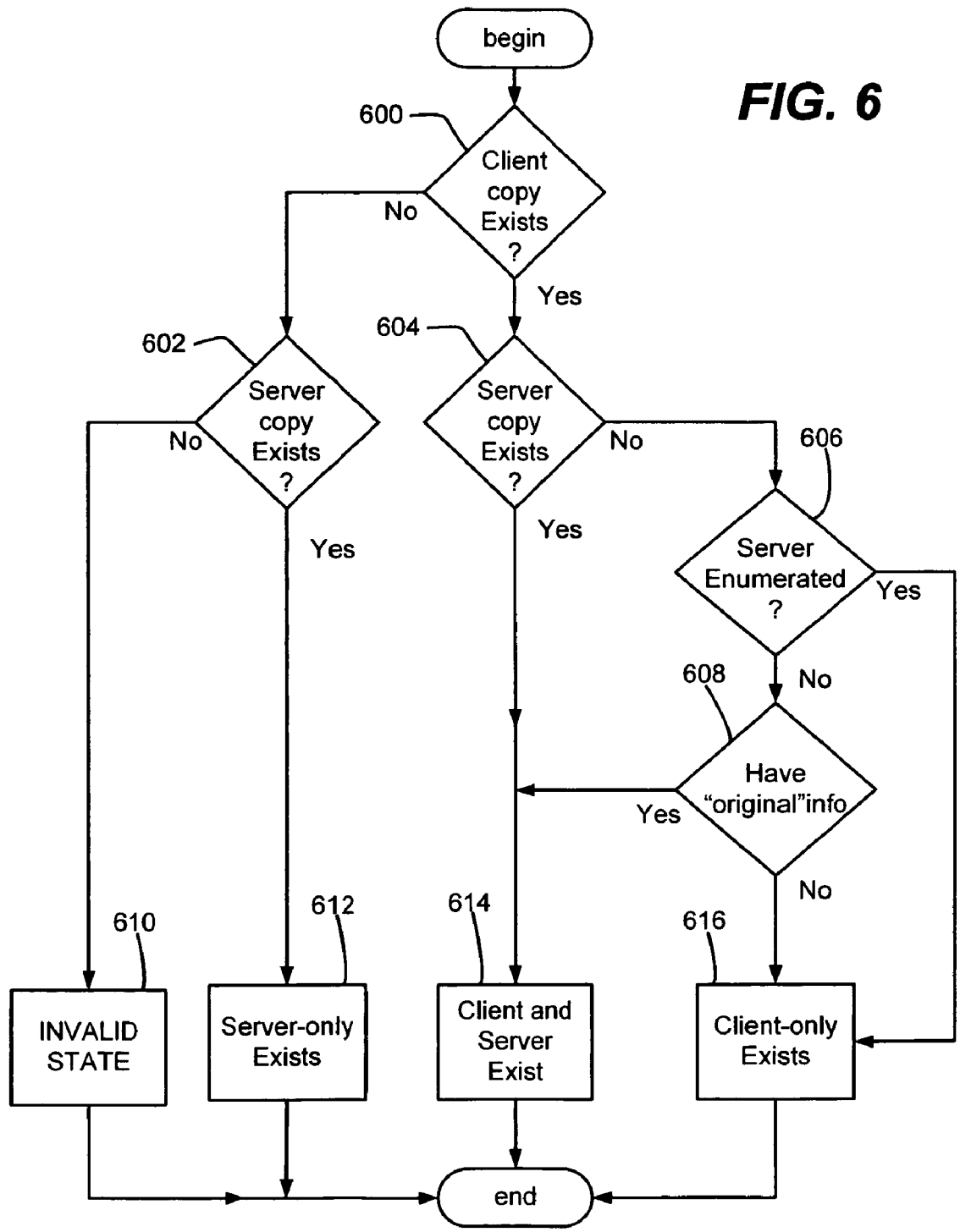
FIG. 6 is a flow diagram representing example logic used to determine a synchronization state translation table based on information in a synchronization state data structure for selecting a synchronization action in accordance with various aspects of the present invention.

This decision is obtained by an evaluation of eight of the bits in the PFS item's SyncStatus value, along with some logic described in FIG. 6. These three possibilities result in three tables of state information, each having relatively small and manageable table sizes, each referred to as a "synchronization state translation" table. FIG. 6 illustrates the logic used to select which table is applicable for the PFS tree item being evaluated.

In general, the logic in FIG. 6 is self-explanatory with the branches based on bit values in the structure 432 of FIG. 4 for the given item. For example, step 600 is determinable via the (least significant) bit "client copy does not exist" value, while steps 602 and 604 are determinable via the "server copy does not exist" bit value.

Note that the branch in FIG. 6 that leads to the Client-and-Server-Exists state translation table (block 614) handles the case where the server was not enumerated (step 606), but there is valid original information obtained the last time there was a synchronization with the server (step 608). In such an event, the scenario is treated as if both the client and server copies exist, and the original server information is used as the current state of the server copy. If during the synchronization processing, the FastSync subsystem 210 finds that this information is no longer correct, the FastSync subsystem 210 notifies the synchronization controller 208 through a callback function and the synchronization controller 208 decides how to proceed.

Figure 7:
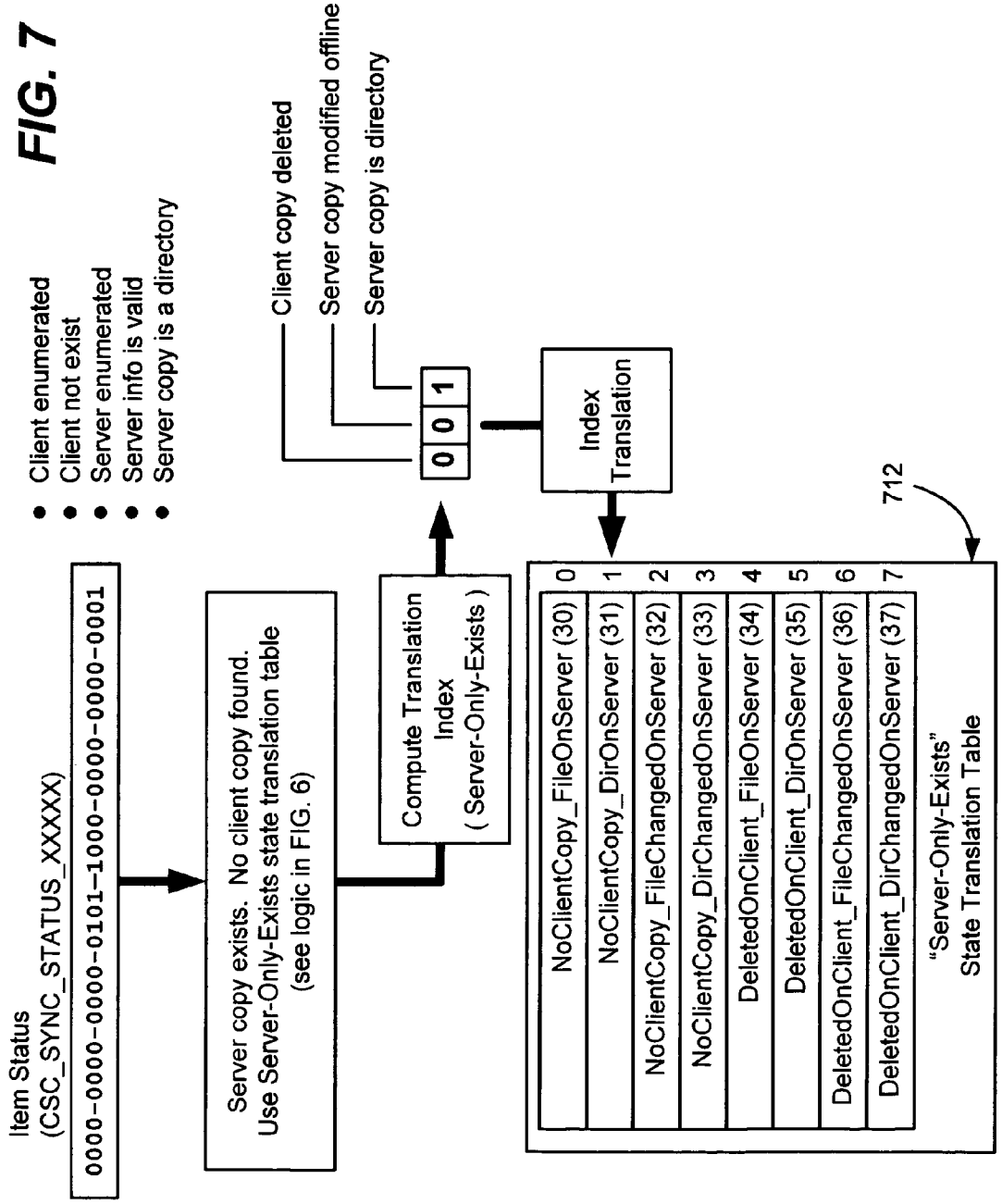
FIG. 7 is a representation of an example selection of a synchronization state code via a selected index into a synchronization state translation table, in accordance with various aspects of the present invention.

Each of the three state translation tables, represented in FIG. 6 via blocks 612, 614 and 616, thus maps a set of PFS item state information to a subset of the synchronization state values. The synchronization controller 208 examines additional information in the data structure to build an index into the translation table based on that state, and obtains the corresponding synchronization state from the table entry. FIG. 7 illustrates this process for a simple example in which the client does not exist and a server directory does not yet exist in the local cache.

As represented in FIG. 7, the Server-Only-Exists translation table 712 (selected via the logic of FIG. 6) considers three pieces of information for computing the index, namely whether the server copy is a file or directory, whether the server copy was modified offline, and/or whether the client copy was deleted. Because of the prior translation table process of FIG. 6, it is already known that the client copy does not exist. This knowledge greatly simplifies the logic and reduces the state translation table 712 to only eight entries. In the example of FIG. 7, the only bit that is currently set is the one indicating that the server copy is a directory. Therefore, the index into the table 712 has the value 001 binary. As shown in FIG. 7, that index value is used to map into the Server-Only-Exists state translation table 712, which is named "NoClientCopy_DirOnServer" and has a corresponding value of thirty (30) associated therewith as an value representing one of the fifty known synchronization states. As is understood, the name describes exactly the state of the PFS tree item that was evaluated.

Note that in an alternative example, had the "deleted on client" bit been set, a table index of five (101 binary) would have instead been computed, resulting in a synchronization state of "DeletedOnClient_DirOnServer." Again, however, an unambiguous translation of PFS item state to synchronization state would be achieved. This translation sequence is performed for every item in the PFS item tree.

Figure 8:
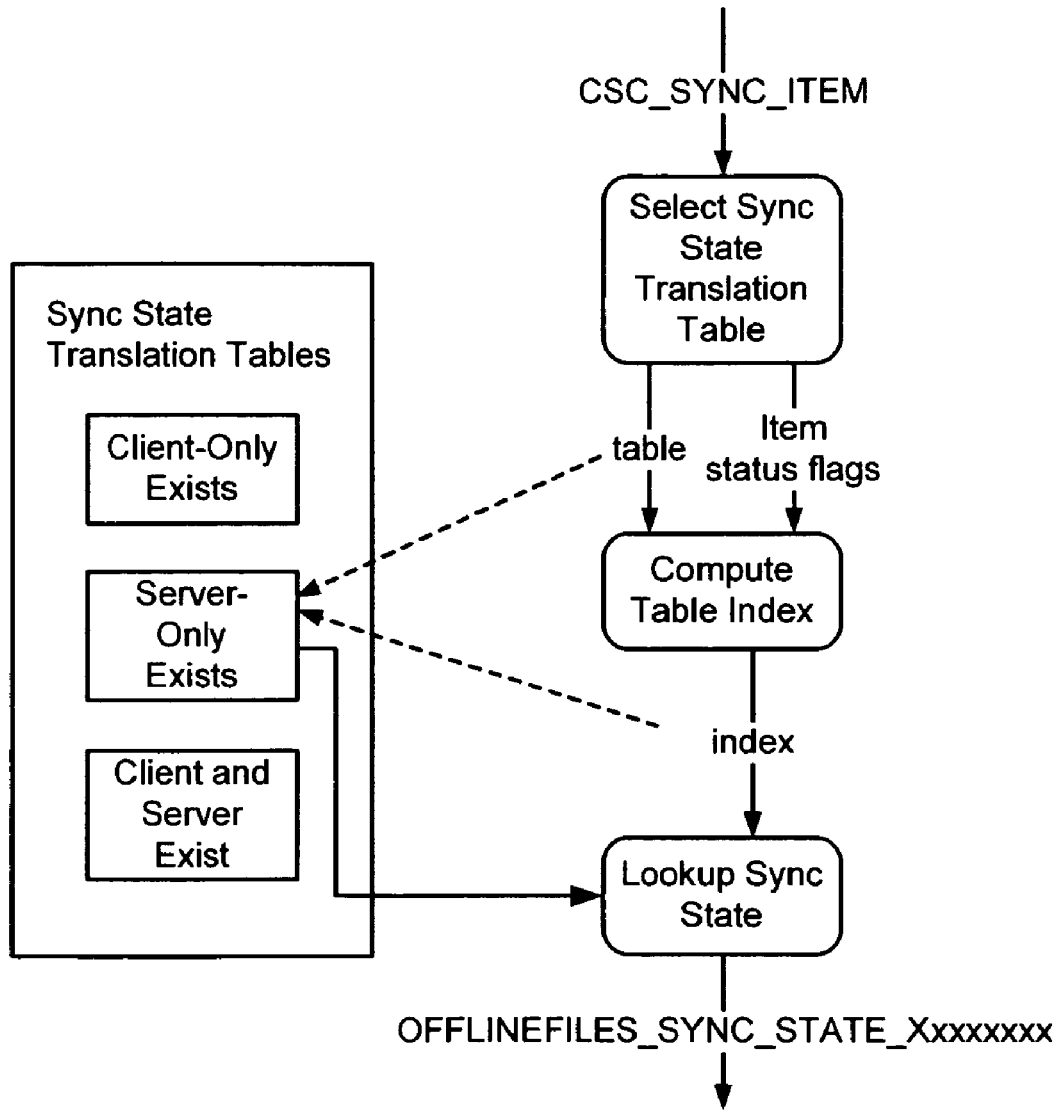
FIG. 8 is an example representation summarizing the translation process of FIGS. 6 and 7, in accordance with various aspects of the present invention.

FIG. 8 summarizes the translation process of FIGS. 6 and 7. As seen in FIG. 8, the state information for the item is used to select a table from among the client-only exists, server-only exists and client and server exists tables, and to compute an index into those tables using other information in the state information. The table entry identifies the synchronization state for that item.

The three synchronization state translation tables and their respective indexes are set forth below:

| Server-Only-Exists Synchronization State Translation | |
|---|---|
| Index | Synchronization state |
| 000 | NoClientCopy_FileOnServer (30) |
| 001 | NoClientCopy_DirOnServer (31) |
| 010 | NoClientCopy_FileChangedOnServer (32) |
| 011 | NoClientCopy_DirChangedOnServer (33) |
| 100 | DeletedOnClient_FileOnServer (34) |
| 101 | DeletedOnClient_DirOnServer (35) |
| 110 | DeletedOnClient_FileChangedOnServer (36) |
| 111 | DeletedOnClient_DirChangedOnServer (37) |

| Server-Only-Exists Synchronization state Translation Index Bit Definitions | |
|---|---|
| Bit | Definition |
| 001 | Server copy is a directory |
| 010 | Server copy modified while client offline |
| 100 | Client copy deleted. |

| Client-Only-Exists Synchronization state Translation | |
|---|---|
| Index | Synchronization state |
| 0-0000 | FileOnClient_NoServerCopy (2) |
| 0-0001 | FileDeletedOnServer (46) |
| 0-0010 | DirOnClient_NoServerCopy (5) |
| 0-0011 | DirDeletedOnServer (49) |
| 0-0100 | FileOnClient_NoServerCopy (2) |
| 0-0101 | FileSparseOnClient_DeletedOnServer (17) |
| 0-0110 | INVALID |
| 0-0111 | DirDeletedOnServer (49) |
| 0-1000 | FileCreatedOnCleint_NoServerCopy (6) |
| 0-1001 | FileCreatedOnClient_DeletedOnServer (11) |
| 0-1010 | DirCreatedOnClient_NoServerCopy (20) |
| 0-1011 | DirCreatedOnClient_DeletedOnServer (25) |
| 0-1100 | INVALID (created + sparse) |
| 0-1101 | INVALID (created + sparse) |
| 0-1110 | INVALID (created + sparse) |
| 0-1111 | INVALID (created + sparse) |
| 1-0000 | INVALID (must have been deleted on server) |
| 1-0001 | FileChangedOnClient_DeletedOnServer (15) |
| 1-0010 | INVALID (must have been deleted on server) |
| 1-0011 | DirChangedOnClient_DeletedOnServer (29) |
| 1-0100 | INVALID (changed + sparse) |
| 1-0101 | INVALID (changed + sparse) |
| 1-0110 | INVALID (changed + sparse) |
| 1-0111 | INVALID (changed + sparse) |
| 1-1000 | FileCreatedOnClient_NoServerCopy (6) |
| 1-1001 | FileCreatedOnClient_DeletedOnServer (11) |
| 1-1010 | DirCreatedOnClient_NoServerCopy (20) |

| Client-Only-Exists Synchronization state Translation | |
| --- | --- |
| Index | Synchronization state |
| 1-1011 | DirCreatedOnClient_DeletedOnServer (25) |
| 1-1100 | INVALID (changed + sparse) |
| 1-1101 | INVALID (changed + sparse) |
| 1-1110 | INVALID (changed + sparse) |
| 1-1111 | INVALID (changed + sparse) |

| Client-Only-Exists Synchronization state Translation Index Bit Definitions | |
| --- | --- |
| Bit | Definition |
| 0-0001 | Server copy deleted offline |
| 0-0010 | Client copy is a directory |
| 0-0100 | Client copy is sparse |
| 0-1000 | Client copy created offline |
| 1-0000 | Client copy modified offline |

| Client-and-Server-Exist Synchronization state Translation | |
| --- | --- |
| Index | Synchronization state |
| 00-0000 | Stable (0) |
| 00-0001 | FileOnClient_DirOnServer (1) |
| 00-0010 | FileChangedOnServer (44) |
| 00-0011 | DirChangedOnServer (47) |
| 00-0100 | DirOnClient_FileOnServer (3) |
| 00-0101 | Stable (0) |
| 00-0110 | DirOnClient_FileChangedOnServer (4) |
| 00-0111 | DirChangedOnServer (47) |
| 00-1000 | FileSparseOnClient (38) |
| 00-1001 | FileSparseOnClient_DirOnServer (18) |
| 00-1010 | FileSparseOnClient_ChangedOnServer (16) |
| 00-1011 | FileSparseOnClient_DirChangedOnServer (19) |
| 00-1100 | DirSparseOnClient (41) |
| 00-1101 | INVALID (dir sparse on client and exists on server) |
| 00-1110 | DirOnClient_FileChangedOnserver (4) |
| 00-1111 | DirChangedOnServer (47) |
| 01-0000 | FileCreateOnClient_FileOnServer (9) |
| 01-0001 | FileCreatedOnClient_DirOnServer (10) |
| 01-0010 | FileCreatedOnClient_FileChangedOnServer (7) |
| 01-0011 | FileCreatedOnClient_DirChangedOnServer (8) |
| 01-0100 | DirCreatedOnClient_FileOnServer (22) |
| 01-0101 | DirCreatedOnClient_DirOnServer (21) |
| 01-0110 | DirCreatedOnClient_FileChangedOnServer (23) |
| 01-0111 | DirCreatedOnClient_DirChangedOnServer (24) |
| 01-1000 | INVALID (created + sparse) |
| 01-1001 | INVALID (created + sparse) |

| Client-and-Server-Exist Synchronization state Translation | |
| --- | --- |
| Index | Synchronization state |
| 01-1010 | INVALID (created + sparse) |
| 01-1011 | INVALID (created + sparse) |
| 01-1100 | INVALID (created + sparse) |
| 01-1101 | INVALID (created + sparse) |
| 01-1110 | INVALID (created + sparse) |
| 01-1111 | INVALID (created + sparse) |
| 10-0000 | FileChangedOnClient (39) |
| 10-0001 | FileChangedOnClient_DirOnServer (13) |
| 10-0010 | FileChangedOnClient_ChangedOnServer (12) |
| 10-0011 | FileChangedOnClient_DirChangedOnServer (14) |
| 10-0100 | DirChangedOnClient_FileOnServer (26) |
| 10-0101 | DirChangedOnClient (42) |
| 10-0110 | DirChangedOnClient_FileChangedOnServer (27) |
| 10-0111 | DirChangedOnClient_ChangedOnServer (28) |
| 10-1000 | INVALID (changed + sparse) |
| 10-1001 | INVALID (changed + sparse) |
| 10-1010 | INVALID (changed + sparse) |
| 10-1011 | INVALID (changed + sparse) |
| 10-1100 | INVALID (changed + sparse) |
| 10-1101 | INVALID (changed + sparse) |
| 10-1110 | INVALID (changed + sparse) |
| 10-1111 | INVALID (changed + sparse) |
| 11-0000 | FileCreateOnClient_FileOnServer (9) |
| 11-0001 | FileCreateOnClient_DirOnServer (10) |
| 11-0010 | FileCreateOnClient_FileChangedOnServer (7) |
| 11-0011 | FileCreateOnClient_DirChangedOnServer (8) |
| 11-0100 | DirCreatedOnClient_FileOnServer (22) |
| 11-0101 | DirCreatedOnClient_DirOnServer (21) |

| Client-and-Server-Exist Synchronization state Translation | |
| --- | --- |
| Index | Synchronization state |
| 11-0110 | DirCreatedOnClient_FileChangedOnServer (23) |
| 11-0111 | DirCreatedOnClien_DirChangedOnServer (24) |
| 11-1000 | INVALID (changed + sparse) |
| 11-1001 | INVALID (changed + sparse) |
| 11-1010 | INVALID (changed + sparse) |
| 11-1011 | INVALID (changed + sparse) |
| 11-1100 | INVALID (changed + sparse) |
| 11-1101 | INVALID (changed + sparse) |
| 11-1110 | INVALID (changed + sparse) |
| 11-1111 | INVALID (changed + sparse) |

| Client-and-Server-Exist Synchronization state Translation Index Bit Definitions | |
| --- | --- |
| Bit | Definition |
| 00-0001 | Server copy is a directory |
| 00-0010 | Server copy modified offline |
| 00-0100 | Client copy is a directory |
| 00-1000 | Client copy is sparse |
| 01-0000 | Client copy created offline |
| 10-0000 | Client copy modified offline |

As can be readily appreciated, the selection and use of three tables is only one alternative. In other alternatives, a greater or lesser number of tables, or even ones based on criteria other than existence can be used, with a suitable index computed for each. For example, it is feasible to essentially do the opposite of above, e.g., use the existence information as the indexes into other that are logically selected based on the additional information (the definitions in the above tables). Further, rather than be used as an index, whether the copy (or both copies) is a directory may be used to divide the three above-described tables into more tables with a lesser number of indexed entries in each.

In accordance with another aspect of the present invention, once the table has been chosen and the index computed to determine a selected one of the fifty synchronization state codes, the code describes the state of a PFS tree item. A next task is to determine which FastSync action or actions is necessary to bring the local and remote state into equilibrium. As with all of the previous processing, a design that is direct, reliable, understandable, and maintainable is desirable.

One mechanism essentially builds an array of fifty elements, each one corresponding to one of the fifty synchronization state codes, with each array element having an associated operation set for the FastSync subsystem 210 to perform. Note that some extra abstraction is used to accommodate the fact that some synchronization states require only one FastSync operation, while others may require more. By way of example, consider starting with a file that is synchronized at one point and then later modified while offline. While offline, if someone deleted the file on the server and created a directory in its place, this scenario is detected as a conflict when later synchronizing. To resolve this complex scenario, the directory on the server may be replaced with the local file copy, or the local file copy may be replaced with the directory from the server. While neither is likely desirable from the perspective of both parties, eventually one of these courses of action needs to be taken to bring both the server and local cache into a synchronized state. If the conflict resolution is to "keep the local state", the directory tree needs to be deleted on the server and the local copy of the file synchronized to the server. To do that, two FastSync operations are required, namely one to remove the directory tree from the server and another to synchronize the local file from the cache to the server.

Figure 9:
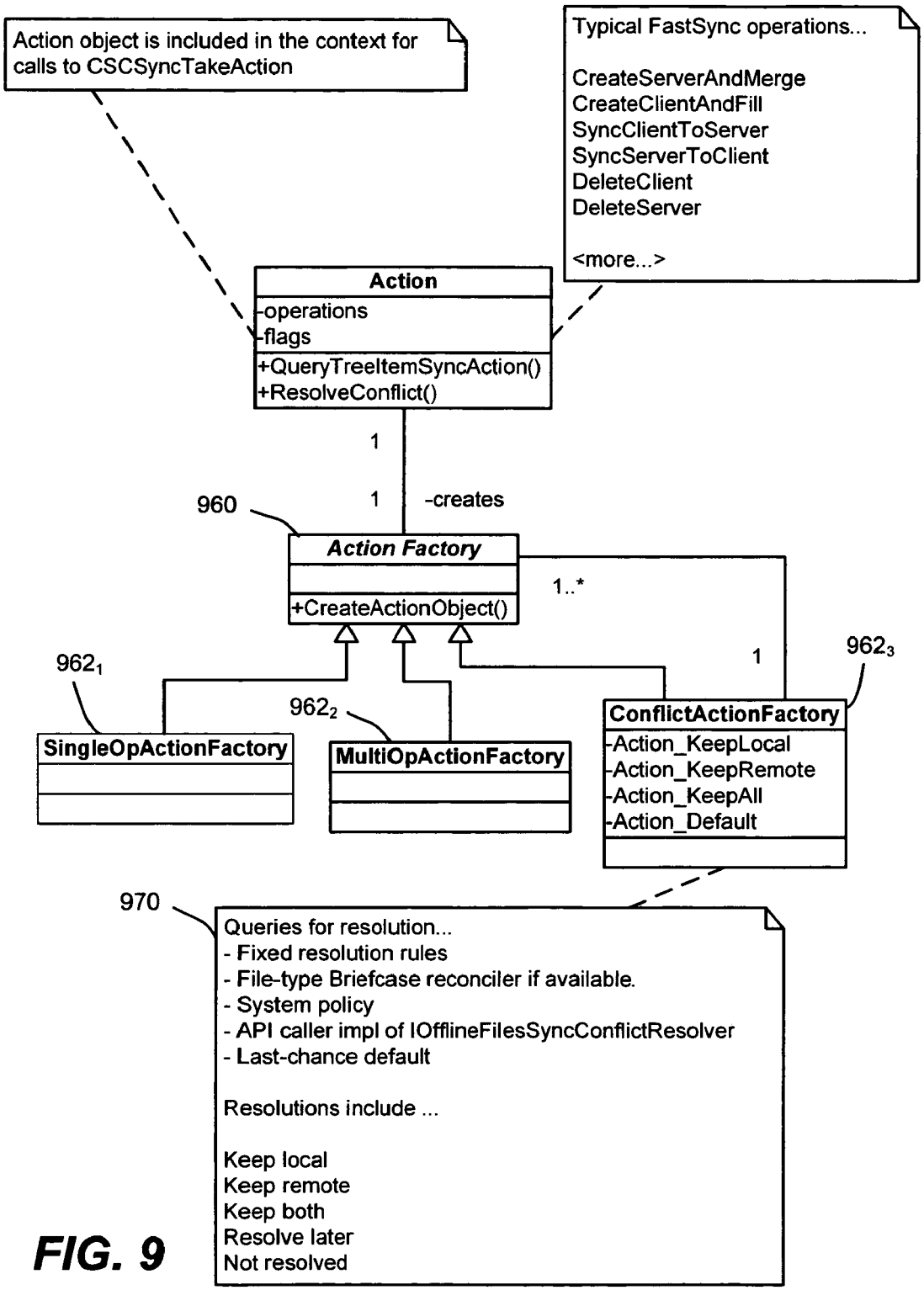
FIG. 9 is an example representation of a synchronization action with various associated information, in accordance with various aspects of the present invention.

In one implementation, the design does not restrict the number of FastSync operations supported for the synchronization of any one item. To accommodate this, as generally represented in FIG. 9, the present invention provides a synchronization action object 960 created via a synchronization action factory, e.g., factory $962_1$-$962_3$. In general, the factory objects create instances of synchronization action objects, with each synchronization action object 960 providing the necessary information to direct the FastSync subsystem 210 to operate.

Along with allowing single or multiple FastSync operations, FIG. 9 illustrates another reason for using the factories $962_1$-$962_3$ to generate action objects, namely that when dealing with a synchronization conflict scenario, the actions to take are not known until it is known how the conflict is to be resolved. In such situations, a Conflict action factory $962_3$ is used, comprising special factories that set up a level of indirection based on a chosen resolution to a synchronization conflict situation. As indicated in the information set 970 of FIG. 9, rules, reconcilers, system policy, the calling applications and/or default behavior may be used to obtain a conflict resolution result. Based on the conflict resolution, e.g., "keep local", "keep remote" and so forth as also indicated in the information set 970, the factory object $962_3$ may delegate action object creation to another factory (e.g., $962_1$ or $962_2$) configured to generate the correct action object for the necessary FastSync operations to satisfy the chosen resolution.

Figure 16:
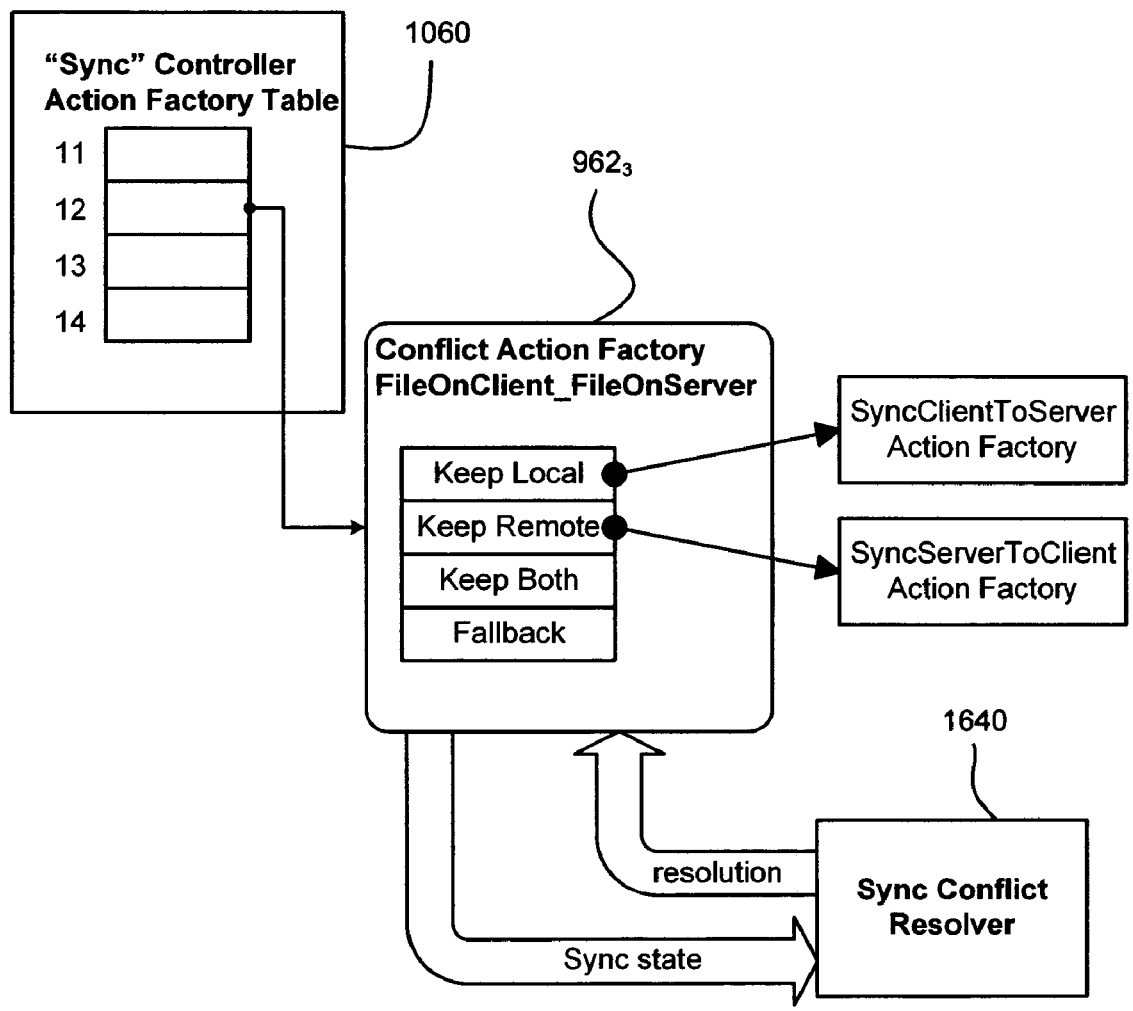
FIG. 16 is a representation of an example handling of conflict resolution via objects via an additional level of indirection, in accordance with various aspects of the present invention.

To handle conflicts, as generally represented in FIG. 16, the synchronization controller 208 associates an instance of the Conflict action factory $962_3$ with each synchronization state that is considered a conflict, which generally comprises a synchronization state that requires the intervention of a live user or of a system policy in order to determine what action to take. These special action factories are configured with a set of pointers to normal action factories. Each pointer represents the action to be taken in response to a particular conflict resolution result (i.e. "keep local", "keep remote").

Using this method, the conflict scenarios use standard action factories, but have an extra level of processing to determine which actions need to be taken to satisfy the resolution directive of the user or system policy. Note that the resolving of a conflict happens at the time an action factory is selected, which is before the action is submitted to the FastSync subsystem 210. To reiterate, the policy decisions are left to the synchronization controller 208, with the FastSync subsystem 210 being concerned only with carrying out fundamental operations.

As shown in FIG. 16, within the "Sync Conflict Resolver" 1640, when the synchronization controller 208 is first instantiated, it creates a helper object called a conflict resolver. This object is responsible for processing a conflict through a series of steps in an attempt to find a resolution, using mechanisms based on fixed rules, a reconciler (e.g., Windows® Briefcase Reconciler), system policy, an API client and/or default last-chance resolution. Each of these mechanisms has an implementation of IOfflineFilesSyncConflictHandler associated with it, and except for the "API client" instance, is internal to the client-side caching service 204. Each mechanism is given the chance to examine the item and its synchronization state and make a decision on how to resolve it. In one implementation, possible responses a handler can make when asked to resolve a conflict include none, keep local, keep remote, keep all changes, keep latest, resolve later, and abort. Each of these is identified with an element of the OFFLINEFILES_SYNC_CONFLICT_RESOLVE enumeration.

In one implementation, the conflict resolver 1640 processes the handler list in the order shown above. This order may be fixed so as to not be adjustable by policy. If a handler returns a resolution code other than "None", the resolution is considered "handled" and the FastSync subsystem 210 is directed accordingly. If "None" is returned, the next handler in line is consulted. The default "last-chance" handler typically indicates to "Resolve later", causing the client-side caching service 204 to make a note of the conflict in the deferred conflict log and leave the item unsynchronized.

Consulting fixed rules, if any, allows the client-side caching service 204 to automatically handle conflicts for known system files in known locations. For example, in most situations the desktop.ini file for a redirected shell folder should always keep the remote copy under the assumption that a local copy may have been maliciously tampered with and/or to avoid user confusion. A fixed rules conflict handler can make this determination and direct the FastSync subsystem 210 to "keep remote."

If there is a briefcase reconciler registered for the file type being synchronized, it may be invoked if the conflict is still unresolved and given a chance to reconcile the file using the IReconcilableObject interface. System policy may specify a particular resolution for any file type, file location, or file type in a particular location. The values may be placed in the registry. Under one or more of these keys is placed a list of values. If a resolution code is provided, that resolution is automatically applied to the conflict scenario. If a handler CLSID or ProgID is specified, that implementation of IOfflineFilesSyncConflictHandler is instantiated and consulted for a resolution code through the ResolveConflict( ) method.

Presently supported numeric resolution codes include:

| Code | Meaning |
| --- | --- |
| "0" | No resolution |
| "1" | Keep local state |
| "2" | Keep remote state |
| "3" | Keep all changes |

-continued

| Code | Meaning |
|------|---------|
| "4"  | Keep latest state |
| "5"  | Resolve later—record in deferred conflict store |

Note that these values are stored as type REG_SZ, not as type REG_DWORD. These values correspond directly to members of the OFFLINEFILES_SYNC_CONFLICT_RESOLVE enumeration. Further, note that as used herein, conflict resolution may be to keep state; e.g., rather than "keep local copy" or "keep remote copy," when resolving a conflict, it is possible that one of the copies does not exist and the resolution is thus of the difference between a deletion on one end and a change on the other. In those terms, the conflict handler is choosing to preserve one endpoint's state. As used herein, however, keeping "state" and keeping a "copy" are equivalent, even though the copy may technically be non-existent. If no handlers are registered, the default response is "None" and the conflict is passed down the line to the next handler.

Another handler is an implementation of IOfflineFilesSyncConflictHandler provided by the caller of IOfflineFilesCache::Synchronize. Callers of the Synchronize system of the present invention may simply let the system resolve the conflict automatically through fixed rules, policy, and registered handlers. However, in situations where the caller does want to be involved in resolving conflicts, the caller implements IOfflineFilesSyncConflictHandler. When provided, that implementation may be consulted, e.g., after "fixed rules", "briefcase reconciler", and "system policy" are unable to determine a resolution. In the event that no prior handler is able to resolve a conflict, the conflict is persisted to a deferred conflict store for later processing through a suitable (e.g., synchronization manager) user interface.

Figure 10:
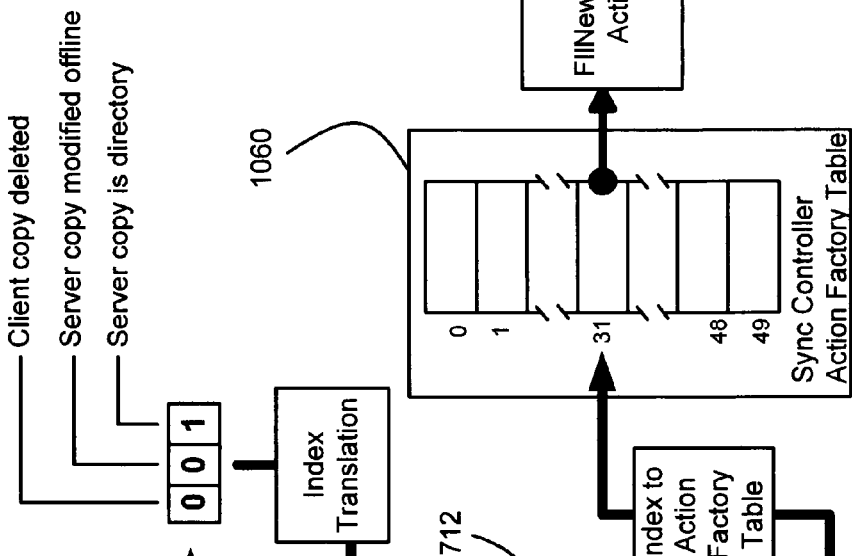
FIG. 10 is a representation of an example selection of a synchronization action factory table for creating an action object, via a selected index into a synchronization state translation table, in accordance with various aspects of the present invention.

Returning to the synchronization processing in general and by way of summary, using the example of FIG. 7 enhanced as generally represented in FIG. 10 with the action factory table 1060, a PFS tree item (e.g., in the data structure 432 of FIG. 4) is received translated to a synchronization state code. That code is then used to identify the synchronization action factory which will produce the synchronization action object. In one implementation (as described below), there may be various types of synchronization controllers; if so, each contains a distinct action factory table that contains fifty elements that each represent one of the fifty synchronization states. Each table element contains the address of a synchronization action factory object that has been programmed to generate synchronization action objects on demand. As a result, once the synchronization state for a given PFS tree item is known, the action factory object that is needed may be directly looked up.

The synchronization state identified in the example of FIGS. 7 and 10 was NoClientCopy_DirOnServer. To synchronize this state, (having a synchronization state code number of thirty-one (31)), the server directory needs to be copied to the client. To do this, the FastSync subsystem 210 provides an operation called "Fill new tree to client". The corresponding entry (i.e., 31) in the Sync Controller's Action Factory Table references an action factory that has been coded to create actions that synchronize to the client a new tree found on the server.

Figure 17:
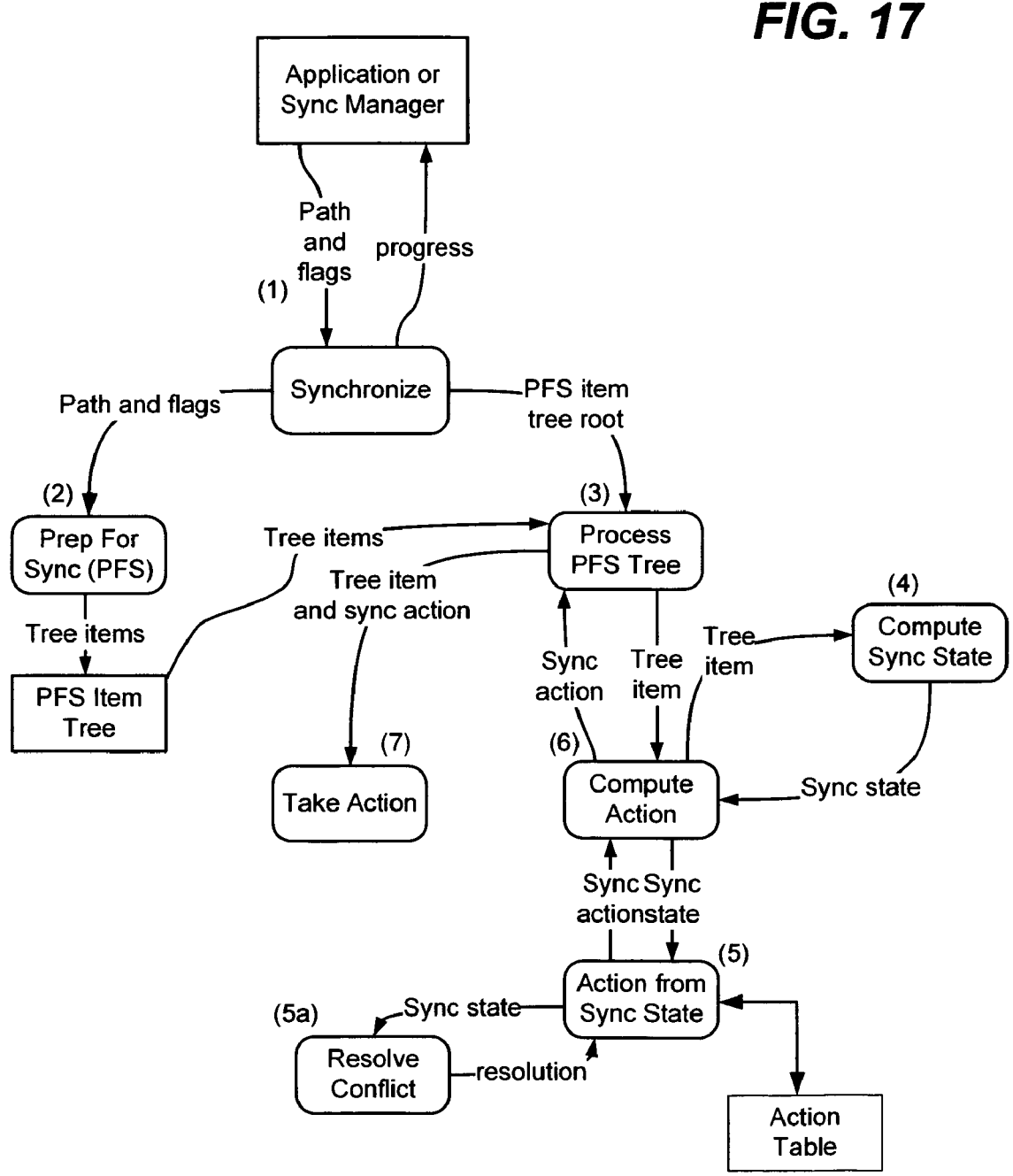
FIG. 17 comprises a summary diagram showing a flow of data through a synchronization system, in accordance with various aspects of the present invention.

FIG. 17 comprises a summary diagram illustrating the flow of data through the system as a synchronization operation is processed. As represented by parenthetical labels one (1) through four (4), in response to a synchronization request, data is gathered through CSCPrepareForSync, the PFS item tree is processed, and the synchronization state is computed. As represented by parenthetical labels five (5) through seven (7), any conflicts are resolved, action factories and ultimately action objects are created, whereby the FastSync subsystem 210 is directed to perform the necessary operations to bring the cache into a stable state with the server.

Figure 11:
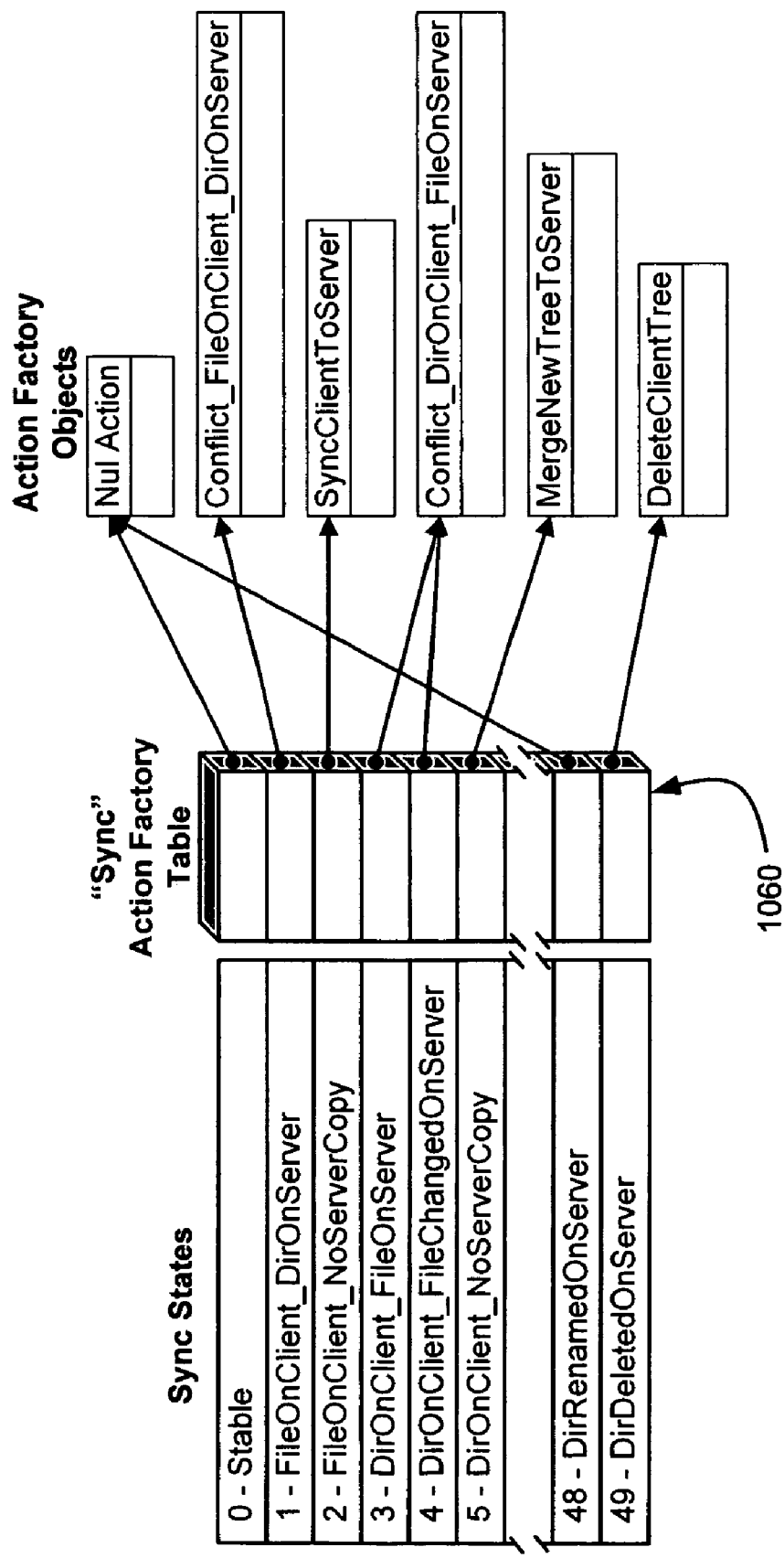
FIG. 11 is an example representation of mapping a synchronization controller's action factory table into a set of action objects, in accordance with various aspects of the present invention.

FIG. 11 further illustrates how some of the fifty synchronization states map to an action factory designed to generate a specific type of synchronization action object. FIG. 11 also illustrates how some synchronization states require no action, while some actions are utilized by multiple synchronization states. Note that the DirRenamedOnServer is mapped to Nul action in this example, but may be resolved in other ways, e.g., as a special case. In any event, the action factory table design makes it very easy to adjust the way that client-side caching synchronization handles a particular synchronization scenario.

Once a synchronization action object is identified, processing generally comprises communicating the FastSync operations to the FastSync subsystem 210 and monitoring callbacks. Note that as generally consistent herein, there may be considered to be a difference between the terms "action" and "operation," in that an "operation" generally refers to a single command unit understood by the FastSync subsystem 210, which are identified by the CSC_SYNC_OP enumeration:

```
typedef enum _CSC_SYNC_OP
{
    CSC_SYNC_OP_PIN = 0,
    CSC_SYNC_OP_CREATE_           // non-conflict merge
SERVER_AND_MERGE,
    CSC_SYNC_OP_CREATE_           // non-conflict fill
CLIENT_AND_FILL,
    CSC_SYNC_OP_SYNC_CLIENT_      // conflict client-is-truth
TO_SERVER,
    CSC_SYNC_OP_SYNC_SERVER_      // conflict server-is-truth
TO_CLIENT,
    CSC_SYNC_OP_COPY_CLIENT_
TO_PATH,
    CSC_SYNC_OP_COPY_SERVER_
TO_PATH,
    CSC_SYNC_OP_DELETE_CLIENT,
    CSC_SYNC_OP_DELETE_SERVER,
    CSC_SYNC_OP_PIN_TREE,
    CSC_SYNC_OP_FILL_NEW_TREE_
TO_CLIENT,
    CSC_SYNC_OP_MERGE_NEW_
TREE_TO_SERVER,
    CSC_SYNC_OP_DELETE_CLIENT_
TREE,
    CSC_SYNC_OP_DELETE_SERVER_
TREE,
    CSC_SYNC_OP_NONE
} CSC_SYNC_OP;
```

To perform a FastSync operation, the synchronization controller 208 calls the CSCSyncTakeAction function with the address of an item from the PFS item tree 523 (FIG. 5) and one of these operation codes. In response, the FastSync subsystem 210 performs the stated operation.

As described above, certain logical synchronization actions require multiple FastSync operations, in which the one-to-many relationship between a logical action and a FastSync operation is one function of the action object. In essence, the action object comprises an aggregation of one or more FastSync operations. Whenever a logical synchronization action requires multiple operations, the synchronization controller 208 continues to query the action object for an operation code and call CSCSyncTakeAction until a full set of operations associated with that action have been issued to the FastSync subsystem 210.

Note some of the operation codes in CSC_SYNC_OP contain the term "TREE." These operations are used when acting on an entire tree in the file system. In general, the FastSync subsystem 210 tries to keep the size of the in-memory PFS item tree to a minimum. One significant tool in that effort is the "tree" operation. For example, in the earlier example of a directory tree having been created on the server, that particular scenario is represented with only a single PFS tree item corresponding to the topmost directory in that directory tree. To perform the necessary synchronization for that entire tree, the synchronization controller 208 uses one of the "TREE" operations. In this case the FILL_NEW_TREE_TO_CLIENT operation is used.

Some actions need to influence the FastSync subsystem's behavior even during the synchronization processing. By way of example consider a user working on a document in an offline cache. Upon reconnecting to the network and synchronizing with the servers, in this example the directory tree containing the document was deleted. If synchronization proceeds and deletes the directory from the local cache, any important changes made while away from the network would be lost.

From the viewpoint of the FastSync subsystem 210, a directory has been deleted from the server, which is what is indicated in its item state. As such the synchronization controller 208 directs the FastSync subsystem 210 to delete the local copy of that directory via a DELETE_CLIENT_TREE operation. However, to protect the locally-modified document from automatic deletion, its presence needs to be detected, and the item handled as a delete-change conflict.

Figure 12:
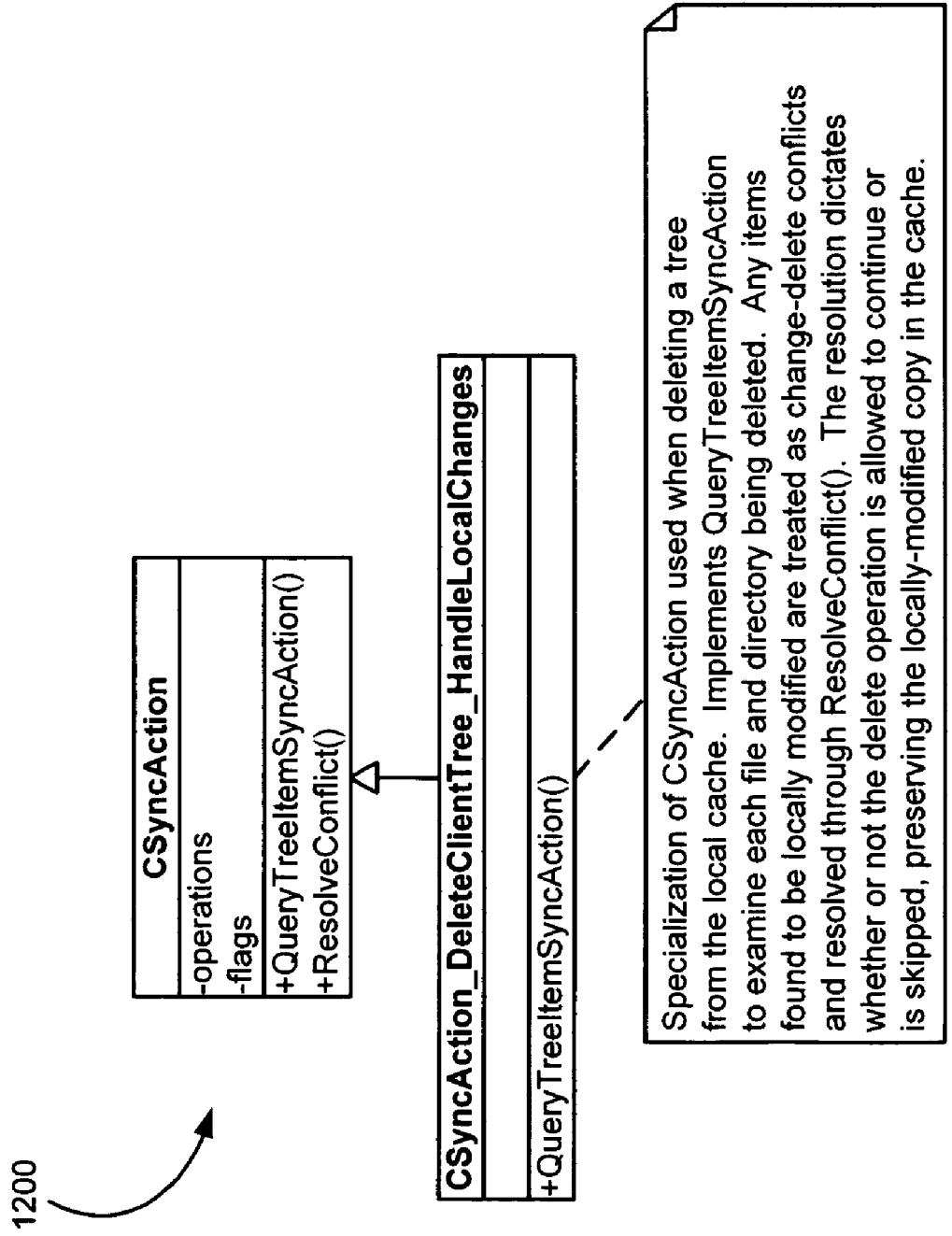
FIG. 12 is an example representation of the specialization available via action objects, in accordance with various aspects of the present invention.

To this end, a specialized form of action object is generated for the two synchronization states associated with local directory deletion, namely DirDeletedOnServer and DirOnClient_NoServerCopy, when the conflict resolution is "keep remote" (that is, delete the local copy). This specialization overrides the default implementation of the QueryTreeItemSyncAction method on the base action object. FIG. 12 illustrates this in a class diagram.

The FastSync subsystem 210 makes a callback to the synchronization controller 208 before processing each item in a tree operation. In response to that callback, the synchronization controller 208 calls the QueryTreeItemSyncAction method on the action object associated with the operation. The default implementation of QueryTreeItemSyncAction in the action base class directs the FastSync subsystem 210 to continue processing and perform the specified operation on that tree item:

```
//
// Base class implementation
//
virtual HRESULT
QueryTreeItemSyncAction(
    int iCurrentSyncOp,
    const CSC_SYNC_ITEM *pItem,
    CSC_SYNC_ACTION *pAction
    )
{
    *pAction = CSC_SYNC_ACTION_CONTINUE;
    return S_OK;
}
```

In the present example, that default behavior will delete the copy of the modified file from the local cache. However, by providing a specialization of the action object that is designed to watch for locally-modified files in this situation, they can be treated as synchronization conflicts. With this behavior available, the normal synchronization conflict behavior can be used, as if simply synchronizing a single file deleted on the server and modified on the client. Based on that conflict resolution, (keep local, keep remote, and so forth) the user can direct the FastSync subsystem 210 to either continue deleting the local copy or to leave it alone. When dealing with locally-modified files, a conservative approach is used. In this case the FastSync subsystem 210 is directed to delete the local copy only when the conflict resolution says to keep the remote (deleted) state; any other resolution preserves the local copy. The file still needs to be manually copied to a safe place, but the file will not be automatically removed without the user's consent.

As mentioned above, there may be different types of synchronization controllers that select various other synchronization-related action factories for other purposes, as described below. To accommodate this in the example implementation described herein, in the client-side caching service 204, there is implemented the core interactions with the FastSync subsystem 210 in a base class for all synchronization controller objects, as generally represented by the object class hierarchy in FIG. 13. The base object 1302 may be referred to as a "FastSync Controller." In one implementation, the available functionality and corresponding structure may be limited only to synchronization. If so, the needed behavior is coded into the CSyncController subclass (1310).

However, because the FastSync subsystem 210 is relatively fast, it may be used for other synchronization-related behaviors, such as "pinning," where pinning essentially refers to marking a cached file in such a way that it will not be automatically evicted when room is needed in the client cache. Pinning a file in the cache may comprise a fill operation, followed by the setting of pin information. In addition, the desired user experience with pinning files is that the user sees the same user interface as when synchronizing. In order to facilitate this, one enhanced synchronization implementation pins files via abstraction and polymorphism.

More particularly, by implementing core functionality in the FastSync controller base class 1302 and delegating variations in behavior to derived classes 1304, 1306 and 1308, the present invention may accomplish both synchronizing and pinning, (including filling via class 1308), as well as unpinning. Thus, as represented in the class hierarchy FIG. 13, in this implementation there are four concrete classes derived from the controller base, namely synchronizing (1310), pinning (1304), pinning and filling (1308), and unpinning (1306).

Benefits from this class hierarchy include a simple public interface, by which clients simply instantiate the desired type of controller and direct it to synchronize, delegating to derived classes the creation of the flags for CSCPrepareForSync, and delegating to derived classes the selection of an action factory table. Other purposes include delegating to derived classes the creation of an operation parameter for CSCSyncTakeAction, and delegating to derived classes (if applicable) the handling of the various callback functions.

Each type of behavior may (or may not) require a different set of the flags to pass to CSCPrepareForSync. For example, CSyncController converts one or more OFFLINEFILES_SYNC_CONTROL_FLAG_XXXXXX values provided by the caller of IOfflineFilesCache::Synchronize into a set of flags for CSCPrepareForSync. Likewise, CPinController specifies only "find server changes" and CUnpinController always specifies "find local changes". With this delegation, each derived class provides the PFS flags needed for the FastSync subsystem 210 to do what is required.

Figure 13:
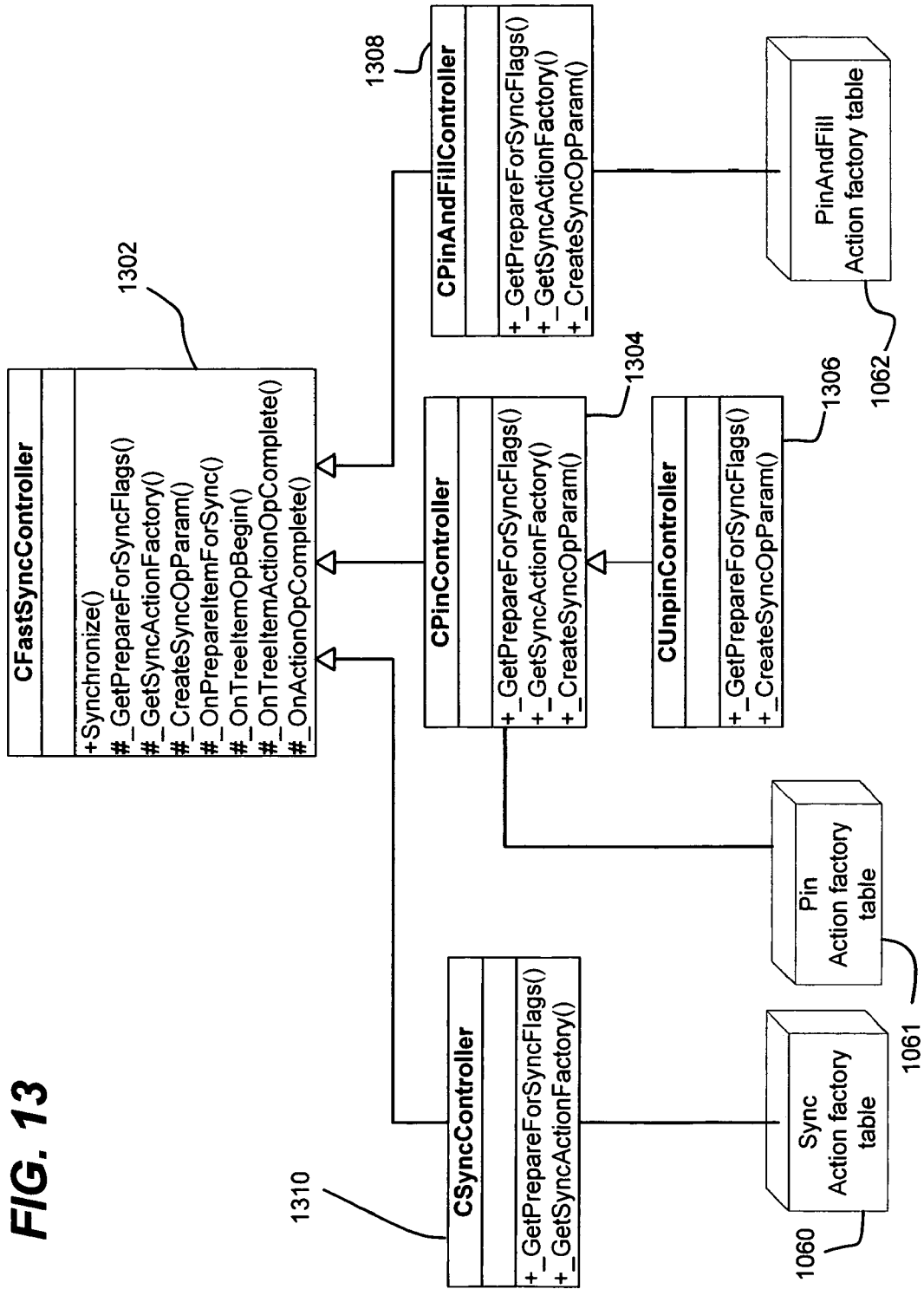
FIG. 13 is a representation of an example synchronization controller class hierarchy, in accordance with various aspects of the present invention.

As also represented in FIG. 13, each specialization of the FastSync controller base class 1302 provides its own action factory table. Because the action factory table identifies what happens in response to a given synchronization state, a specific type of controller can behave differently by taking unique actions for those synchronization states. For example, FIG. 11 showed how the synchronization controller 208 mapped some of the synchronization states to action factory objects using its own table 1060.

Figure 14:
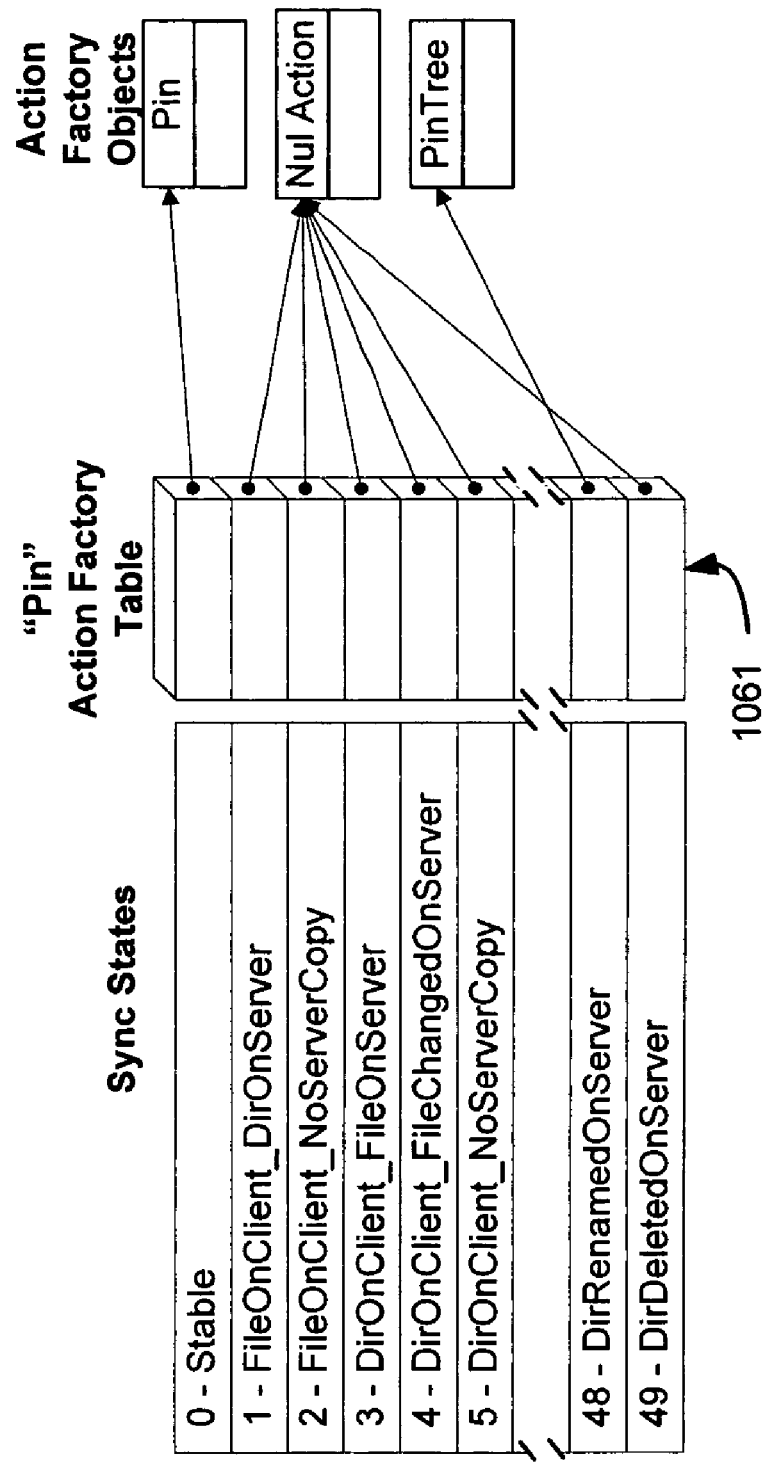
FIG. 14 is an example representation of mapping a pin controller's action factory table into a set of action objects, in accordance with various aspects of the present invention.

The Pin controller object (corresponding to class 1304) may assign a completely different set of actions for each synchronization state in order to perform a "pin" operation. Because pinning is relatively simple compared to general synchronization, there is a relatively few number of unique action factories referenced in the pin controller's action factory table 1061, e.g., most of the synchronization states map to the "nul" action which does nothing, as represented in FIG. 14.

Figure 15:
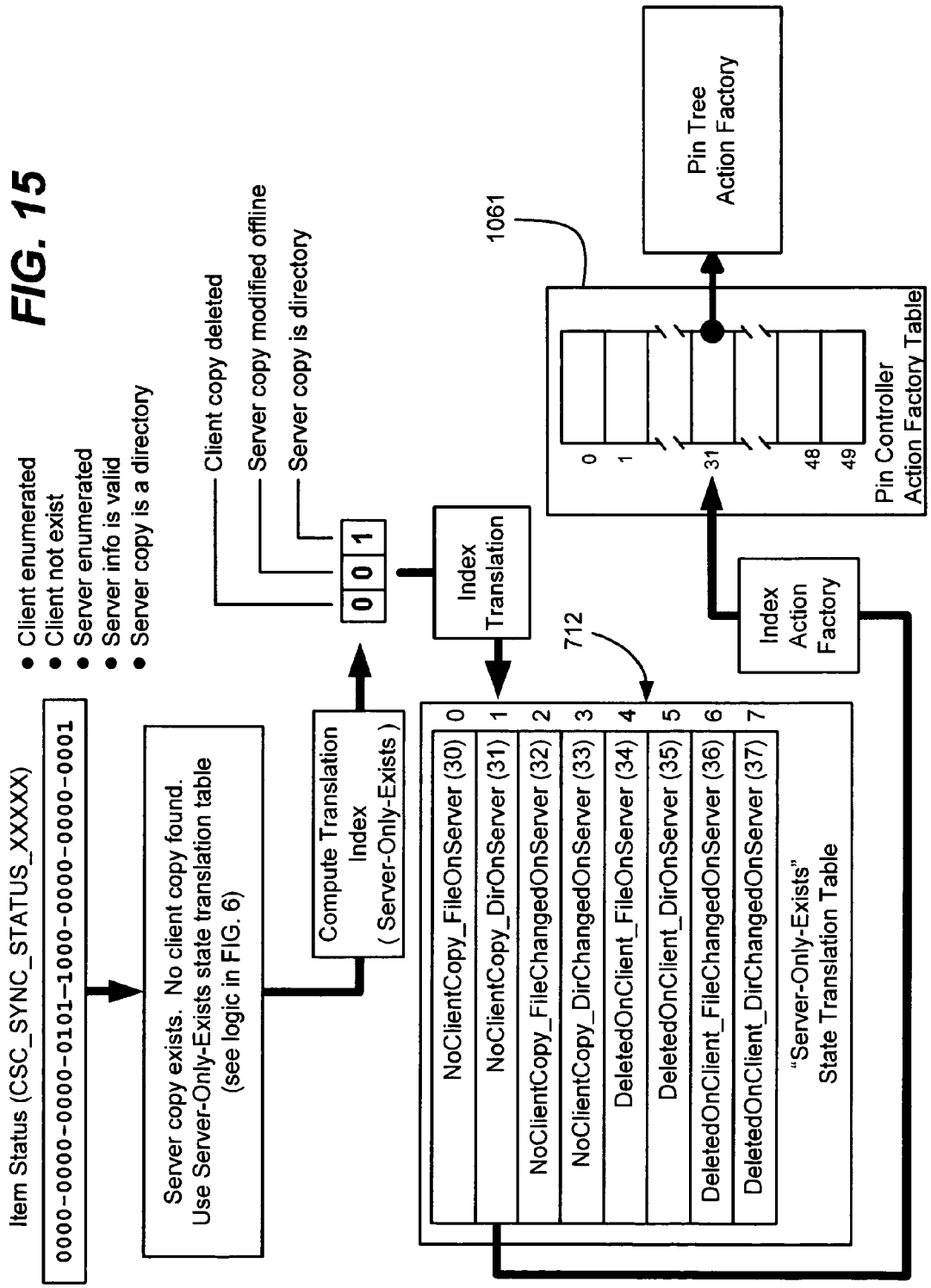
FIG. 15 is a representation of an example selection of a pin controller's action factory table for creating an action object, via a selected index into a synchronization state translation table, in accordance with various aspects of the present invention.

Similar to the prior example of FIGS. 7 and 10, FIG. 15 illustrates the selection of the pin controller action factory table 1061 using the synchronization state translation mechanism. Note that FIG. 15 is similar to FIG. 10, with a difference being the entry pointing to the pin action factory table 1061. In this way the pin controller object, while utilizing the underlying synchronization implementation to do the work, is able to behave differently from the other synchronization controllers. This is essentially a virtual function mechanism with the extra layer of indirection for the action factory.

Some the FastSync subsystem operations also accept a parameter to accompany the command, including for pin operations. Note that a pin/unpin operation also needs to specify what pinned state is to be adjusted, e.g., CSC cache entries may be pinned for the "user," "for all users," or "for folder redirection." The pin controller object (corresponding to class 1304) overrides the base method _CreateSyncOpParam to provide this parameter.

As represented in FIG. 13 via class 1306, there also an Unpin controller object. The Unpin controller object comprises a specialization of the Pin controller object including two distinct differences. First, when unpinning, to enumerate content from the client, the Unpin controller will direct CSCPrepareForSync to enumerate local content rather than remote content, as was done by the Pin controller. The Unpin controller does this by implementing _GetPrepareForSyncFlags. Also, when unpinning the FastSync subsystem 210 needs to be directed to CLEAR the specified pin state rather than SET it during the operation. The Unpin controller does this by implementing _CreateSyncOpParam and filling in the proper information to have the pin information cleared.

The addresses of base FastSync controller class functions are provided to the FastSync subsystem 210 for callbacks. Each implementation of those callbacks calls an internal virtual function, with a default implementation that does something reasonable. In general, most of the work is placed into a single common controller implementation, while providing useful specializations in easily-created subclasses.

Callback functions are used to communicate progress and status information, and to receive feedback and direction from the originating caller. Generally there are callbacks when preparing for sync (CSCPrepareForSync callbacks) and when taking action (CSCSyncTakeAction callbacks).

As described above, the base FastSync Controller object contains the common functionality to interact with the FastSync subsystem 210, including to provide the callback functions to the FastSync subsystem's APIs. Each callback pointer provided to the FastSync subsystem 210 is a pointer to a static function in the FastSync controller implementation. A purpose of that static implementation is to extract relevant instance information from the callback's context block and call a corresponding non-static virtual member function. Specialized controller classes are then able to override that function to respond to callbacks in their own specific manner.

The following is an example using the CSCPrepareForSync callback:

```
//
// The virtual method that can be overloaded.
//
virtual CSC_SYNC_ACTION
_OnPrepareItemForSync(CSC_SYNC_PFS_STATUS *pStatus);
//
// The static method called by FastSync.
//
static CSC_SYNC_ACTION
_PrepareForSyncCallback(
    CSC_SYNC_PFS_STATUS *pStatus,
    INT_PTR pContext
    )
{
    CFastSyncController *pThis = (CFastSyncController
*)pContext;
    return pThis->_PrepareForSyncCallback(pStatus);
}
//
// The non-static method that delegates to the virtual method.
// Note at all callbacks are synchronized to avoid race
// conditions with FastSync's multi-threaded processing.
//
CSC_SYNC_ACTION
_PrepareForSyncCallback(
    CSC_SYNC_PFS_STATUS *pStatus
    )
{
    _EnterCallbackCritSec( );
    CSC_SYNC_ACTION result = _OnPrepareItemForSync(pStatus);
    _LeaveCallbackCritSec( );
    return result;
}
```

This pattern is repeated for the CSCSyncTakeAction callbacks as well.

Specifics of FastSync callback functions include CSCPrepareForSync Callbacks, which accept one callback function pointer with the signature PCSC_SYNC_PFS_STATUS_CALLBACK. This pointer type is defined as a function accepting a CSC_SYNC_PFS_STATUS pointer and a context pointer, and returning a CSC_SYNC_ACTION code. These types are shown in the code fragment below:

```
typedef enum _CSC_SYNC_ACTION {
    CSC_SYNC_ACTION_CONTINUE=0,
    CSC_SYNC_ACTION_SKIP,
    CSC_SYNC_ACTION_SYNC_ABORT
} CSC_SYNC_ACTION;
typedef struct _CSC_SYNC_PFS_STATUS {
    PCWSTR Path;             // Path to this directory
    CSC_SYNC_REASON Reason;  // Begin / next item / End
} CSC_SYNC_PFS_STATUS, *PCSC_SYNC_PFS_STATUS;
typedef CSC_SYNC_ACTION
(*PCSC_SYNC_PFS_STATUS_CALLBACK)
(PCSC_SYNC_PFS_STATUS, INT_PTR);
```

As can be seen, the _PrepareForSyncCallback function in the previous code fragment uses this signature.

CSCPrepareForSync calls this callback function whenever it is about to process a directory. The default implementation checks to see if an "abort" response has been received from the API client and aborts the processing if necessary (at present there is no skipping of directories, however, that behavior may be added if desired):

```
CSC_SYNC_ACTION
CFastSyncController::_OnPrepareItemForSync(
    CSC_SYNC_PFS_STATUS *pStatus
)
{
    CSC_SYNC_ACTION action =
    _IsAborting( ) ? CSC_SYNC_ACTION_SYNC_ABORT :
            CSC_SYNC_ACTION_CONTINUE;
    return action;
}
```

CSCSyncTakeAction has a more complex callback structure than CSCPrepareForSync, and in one implementation there are three callbacks utilized by this FastSync API, namely action completion, tree item begin and tree item completion. As described above, the base FastSync Controller 1302 implementation provides the functions that are called directly by the FastSync subsystem 210. These static member functions extract context information and call a non-static member function which then delegates to a virtual function. This behavior is consistent in the handling of FastSync callbacks.

The CSCSyncTakeAction "Action Completion" Callback is called when an operation submitted via CSCSyncTakeAction has completed, successfully or not. The default implementation of this callback handles various scenarios, including a successful action result, a failed action result and when the FastSync subsystem 210 detects a change in item state since the PFS tree item was created. In the first scenario, the operation has completed successfully, whereby the job of the callback is to notify any progress event implementation (IOfflineFilesSyncProgress) of the result of the operation, and, if the action is of the multi-operation form, submit the next FastSync operation associated with the action. This cycle continues until there are no more FastSync operations associated with the action. Note that the progress implementation is able to communicate "abort" in response to any progress notification. In response the sync controller directs the FastSync subsystem 210 to stop synchronizing.

In the second scenario, the operation has failed. Again, the callback notifies any progress event implementation of the failure result and detects any direction to "abort" the processing. The progress implementation is able to indicate a desire to "retry" the operation. If so, the FastSync subsystem 210 is directed to retry and the operation is repeated. If the operation then succeeds, the above-described path is taken. If the operation again fails, the same failure processing is repeated up to some maximum number (e.g., ten times) for a given operation instance.

In the third scenario, the FastSync subsystem 210 has detected that some state of the item being synchronized has changed since that item was first queried by CSCPrepareForSync. When this happens, the callback has various choices, and may abort processing, abandon the operation, retry the operation, retry the operation while ignoring specified differences, and submit the item as a new synchronization action. The retry the operation while ignoring specified differences is a variation of retry, with the addition of telling the FastSync subsystem 210 to ignore some of the differences it found.

The option that submits the item as a new synchronization action processes the associated PFS tree item as an entirely new synchronization action. This involves mapping the item's state to a synchronization state, selecting a synchronization action factory, creating a synchronization action object, and submitting it to the FastSync subsystem 210 via CSCSyncTakeAction. As a result, items that change during synchronization may be eventually subjected to the same evaluation and action logic as items that do not change. This produces a consistent result for the items being synchronized.

The CSCSyncTakeAction "Tree Item Begin" Callback is called by the FastSync subsystem 210 to make policy judgments on individual items in a tree operation, because due to the efficient structure of the PFS item tree, individual elements inside of a tree operation are not present in the PFS item tree. This allows the synchronization controller 208 to evaluate the item and indicate if the operation is allowed to continue or not. It also gives the synchronization controller 208 an opportunity to report progress and check for "abort" signals during a large tree operation.

As described above, accidental deletion of locally-modified files is prevented during a tree deletion operation. The CSCSyncTakeAction "Tree Item Begin" Callback callback is where that processing is performed. The base FastSync controller implementation calls the QueryTreeItemSyncAction method on the Synchronization Action object associated with the callback. A default implementation of this method directs the synchronization controller 208 to continue processing. The specialized version of action callback overloads this method to treat the situation as a delete-change conflict and process it through the normal conflict handling mechanisms. When the conflict resolution is anything but "keep remote," the operation is skipped and the locally-modified file is preserved in the cache.

The CSCSyncTakeAction "Tree Item Completion" Callback is implemented to report completion of a tree item action. It also provides the synchronization controller 208 the opportunity to communicate a client's desire to "abort" back to the FastSync subsystem 210.

As can be seen from the foregoing detailed description, there is provided a method and system for synchronization that is reliable, predictable, understandable, diagnosable and maintainable, via a layered mechanism that gathers information about the local and remote state, decides what actions to take for synchronization, and delivers actions to an underlying synchronization subsystem. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for synchronizing cached files and directories, the method comprising:
   obtaining synchronization state information corresponding to a state of a client cache item of a client computing device and a state of server file system item of a server computing device remote relative to the client computing device;
   providing a plurality of data structures, each data structure representing a subset of a plurality of actions, wherein each action represented in the data structure corresponds to an action acting on objects having common state of at least one of the client cache item and the server file system item;

determining a data structure from among the plurality of data structures based on a first set of information contained within the synchronization state information;

choosing an action from among the subset of a plurality of actions represented by the determined data structure based on a second set of information contained within the synchronization state information, wherein the second set of information comprises: (1) information indicating whether the client cache item was modified, (2) information indicating whether the server file system item was modified, (3) information indicating whether the client cache item is a directory, (4) information indicating whether the server file system item is a directory, (5) information indicating whether modification to the client item was performed offline, or (6) information indicating whether the client item is sparse; and taking the action.

2. The method of claim 1 wherein the common state comprises state information identifying a combination of (1) existence or nonexistence of the client item and (2) existence or nonexistence of the server file system item.

3. The method of claim 2 wherein only the server file system item exists, and wherein choosing the action comprises computing an index into the selected subset of actions utilizing the second set of information by evaluating whether the client item was deleted, evaluating whether the server copy was modified offline, and/or evaluating whether the server item is a directory.

4. The method of claim 2 wherein only the client cache item exists, and wherein choosing the action comprises computing an index into the selected subset of actions utilizing the second set of information by evaluating whether the server item was deleted offline, evaluating whether the client item is a directory, evaluating whether the client item is sparse, evaluating whether the client item was created offline, and/or evaluating whether the client item was modified offline.

5. The method of claim 2 wherein both the client cache item and server file system item exist, and wherein choosing the action comprises computing an index into the selected subset of actions utilizing the second set of information by evaluating whether the server item is a directory, evaluating whether the server item was modified offline, evaluating whether the client item is a directory, evaluating whether the client item is sparse, evaluating whether the client item was created offline, and/or evaluating whether the client item was modified offline.

6. The method of claim 1 wherein choosing an action comprises selecting an action factory that instantiates an action object.

7. The method of claim 1 wherein taking the action includes resolving a conflict.

8. At least one computer-readable storage media storing computer-executable instructions, which when executed perform the method of claim 1.

9. In a computing environment including a client cache and a server file system, a system for synchronizing cached files and directories, the system comprising:

a computer readable storage media having stored thereon compute-executable instructions that when executed form:

a plurality of data structures, each data structure representing a subset of a plurality of action factories, wherein each action factory represented in the data structure corresponds to an action factory acting on items having a common state of at least one of the client cache item and the server file system item;

a plurality of action factories that generate action objects to request performance of at least one synchronization-related operation; and a controller that processes synchronization state information corresponding to a state of a client item located within the client cache and a state of server item located within the server file system, to select one of the action factories based on that state information, wherein the controller determines a selected subset of a plurality of action factories from among a plurality of subsets of a plurality of action factories based on a first set of information contained within the synchronization state information corresponding to existence and non-existence state information, and wherein the selected subset of a plurality of action factories is identified using the first set of information and a corresponding data structure from among the plurality of data structures such that action factories grouped together into each subset are all associated with acting on items having at least one common state information and wherein the synchronization state information used to select one of the action factories further includes a second set of information comprising: (1) information indicating whether the client cache item was modified, (2) information indicating whether the server file system item was modified, (3) information indicating whether the client cache item is a directory, (4) information indicating whether the server file system item is a directory, (5) information indicating whether modification to the client item were performed offline, and (6) information indicating whether the client item is sparse.

10. The system of claim 9 wherein the controller comprises a pin controller that computes an index into a pin action faction factory table to select the action factory.

11. The system of claim 9 wherein the controller comprises a synchronization controller that computes an index into a synchronization action faction factory table to select the action factory.

12. The system of claim 9 wherein the common state information of the subsets of action factories identify whether only the client cache item exists, whether only the server file system item exists, and whether both the client cache item and the server file system item exist.

13. The system of claim 12 wherein the synchronization controller chooses an action from among the selected subset of actions based on a second set of information contained within the synchronization state information, including whether the client item was deleted, whether the server copy was modified offline, and/or whether the server item is a directory.

14. The system of claim 12 wherein the synchronization controller chooses an action from among the selected subset of actions based on a second set of information contained within the synchronization state information, including whether the server item was deleted offline, whether the client item is a directory, whether the client item is sparse, whether the client item was created offline, and/or whether the client item was modified offline.

15. The system of claim 12 wherein the synchronization controller chooses an action from among the selected subset of actions based on a second set of information contained within the synchronization state information, including whether the server item is a directory, whether the server item was modified offline, whether the client item is a directory, whether the client item is sparse, whether the client item was created offline, and/or whether the client item was modified offline.

16. The system of claim 9 further comprising an action object and corresponding conflict action factory that takes an action to resolve a conflict.

17. A computer-readable storage media storing computer-executable instructions, which when executed perform steps, comprising:
obtaining synchronization state flags corresponding to a first set of state information of a client cache item and a first set of state information of server file system item, wherein the first set of state information of the client cache item identifies whether the client cache item exists and wherein the first set of state information of the server file system indicates whether the server file system exists;
providing a set of tables that correlate state information to actions applicable to a particular state, wherein the tables consists of a client-only exists table, a server only exists table, and a client and server exist table;
selecting as a selected table a client-only exists table, a server only exists table, or a client and server exist table based on the synchronization state flags including flags indicating whether the client cache item and server file system item exist, wherein each table contains a plurality of available codes for each combination of client cache item and server file system exist flags, wherein each of the codes within the selected table uniquely corresponds to a recognized client cache item state and server file system item state;
computing an index into the selected table based on a second set of state information for the client cache item and the server file system item wherein the second set of state information consists of (1) information indicating whether the client cache item was modified, (2) information indicating whether the server file system item was modified, (3) information indicating whether the client cache item is a directory, (4) information indicating whether the server file system item is a directory, (5) information indicating whether modification to the client item were performed offline, and (6) indicating whether the client item is sparse and locating a code based on a table entry in the selected table at that index; and
selecting action-related information based on the code to take a synchronization-related action.

18. The computer-readable storage media of claim 17 wherein selecting the action-related information comprises selecting an action factory that instantiates an action object containing data for taking the synchronization-related action.

19. The computer-readable storage media of claim 17 wherein selecting the action-related information comprises selecting an conflict action to resolve a conflict, including by selecting a synchronize-client-to-server action factory for keeping a copy of the client item, or selecting a synchronize-server-to-client action factory for keeping a copy of the server item.

20. The computer-readable storage media of claim 17 wherein a total number of possible unique combinations of state for the client cache item and the server file system item is greater than 10.

21. The computer-readable storage media of claim 17 wherein a total number of possible unique combinations of state for the client cache item and the server file system item is greater than 49.

22. The computer-readable storage media of claim 17 wherein the possible unique combination of state for the client cache item and the server file system consists of Stable, FileOnClient DirOnServer, FileOnClient NoServerCopy, DirOnClient FileOnServer, DirOnClient FileChangedOnServer, DirOnClient NoServerCopy, FileCreatedOnClient NoServerCopy, FileCreatedOnClient FileChangedOnServer, FileCreatedOnClient DirChangedOnServer, FileCreatedOnClient FileOnServer, FileCreatedOnClient DirOnServer, FileCreatedOnClient DeletedOnServer, FileChangedOnClient ChangedOnServer, FileChangedOnClient DirOnServer, FileChangedOnClient DirChangedOnServer, FileChangedOnClient DeletedOnServer, FileSparseOnClient ChangedOnServer, FileSparseOnClient DeletedOnServer, FileSparseOnClient DirOnServer, FileSparseOnClient DirChangedOnServer, DirCreatedOnClient NoServerCopy, DirCreatedOnClient DirOnServer, DirCreatedOnClient, FileOnServer, DirCreatedOnClient FileChangedOnServer, DirCreatedOnClient, DirChangedOnServer, DirCreatedOnClient DeletedOnServer, DirChangedOnClient, FileOnServer, DirChangedOnClient FileChangedOnServer, DirChangedOnClient ChangedOnServer, DirChangedOnClient DeletedOnServer, NoClientCopy FileOnServer, NoClientCopy DirOnServer, NoClientCopy FileChangedOnServer, NoClientCopy DirChangedOnServer, DeletedOnClient FileOnServer, DeletedOnClient DirOnServer, DeletedOnClient FileChangedOnServer, DeletedOnClient DirChangedOnServer, FileSparseOnClient, FileChangedOnClient, FileRenamedOnClient, DirSparseOnClient, DirChangedOnClient, DirRenamedOnClient, FileChangedOnServer, FileRenamedOnServer, FileDeletedOnServer, DirChangedOnServer, DirRenamedOnServer, and DirDeletedOnServer.

* * * * *